US007992102B1

(12) United States Patent  (10) Patent No.: US 7,992,102 B1
De Angelo  (45) Date of Patent: Aug. 2, 2011

(54) GRAPHICAL USER INTERFACE WITH CIRCUMFERENTIALLY DISPLAYED SEARCH RESULTS

(75) Inventor: Michael Joseph De Angelo, Forestville, CA (US)

(73) Assignee: Incandescent Inc., San Rafael, CA (US)

( * ) Notice: Subject to any disclaimer, the term of this patent is extended or adjusted under 35 U.S.C. 154(b) by 1033 days.

(21) Appl. No.: 11/833,861

(22) Filed: Aug. 3, 2007

(51) Int. Cl.
*G06F 3/048* (2006.01)
*G06F 3/14* (2006.01)

(52) U.S. Cl. .................. 715/834; 715/804; 715/864
(58) Field of Classification Search .............. 715/804, 715/834, 864
See application file for complete search history.

(56) References Cited

U.S. PATENT DOCUMENTS

| | | | |
|---|---|---|---|
| 6,236,398 B1 * | 5/2001 | Kojima et al. ............. | 345/419 |
| 6,448,987 B1 * | 9/2002 | Easty et al. ............... | 715/834 |
| 6,795,097 B1 * | 9/2004 | Yamaguchi et al. ........ | 715/810 |
| 6,816,079 B1 * | 11/2004 | Kuenzner et al. ......... | 340/815.4 |
| 7,555,476 B2 * | 6/2009 | Holbrook .................. | 1/1 |
| 7,681,150 B2 * | 3/2010 | Hsieh et al. ............... | 715/854 |
| 7,712,049 B2 * | 5/2010 | Williams et al. ........... | 715/834 |
| 7,716,603 B2 * | 5/2010 | Boyden ..................... | 715/834 |
| 7,721,311 B2 * | 5/2010 | Kowald et al. ............ | 725/52 |
| 2003/0048309 A1 * | 3/2003 | Tambata et al. ........... | 345/810 |
| 2004/0250217 A1 * | 12/2004 | Tojo et al. ................. | 715/810 |
| 2006/0048076 A1 * | 3/2006 | Vronay et al. ............. | 715/850 |

* cited by examiner

*Primary Examiner* — William L. Bashore
*Assistant Examiner* — David Phantana-angkool
(74) *Attorney, Agent, or Firm* — Orrick, Herrington & Sutcliffe

(57) ABSTRACT

A method and system for processing user information are described. A graphical user interface is provided to include a display region, a first bounded region circumferentially surrounding the display region, and a second bounded region circumferentially surrounding the first bounded region. The first bounded region may include one or more first-type graphical user interface elements with each of the first-type graphical user interface elements selectively mapped to one or more first-type display data. The second bounded region may include one or more second-type graphical user interface elements with each of the second-type graphical user interface elements selectively mapped to one or more second-type display data. A user input is received using the graphical user interface, and a result is generated based at least on a user activation of at least one of the first-type and second-type graphical user interface elements.

34 Claims, 15 Drawing Sheets

GRAPHICAL USER INTERFACE WITH CIRCUMFERENTIALLY DISPLAYED SEARCH RESULTS

TECHNICAL FIELD

The present disclosure relates to a Graphical User Interface (GUI). For example, a GUI for quickly and easily displaying time and date and locating or browsing in three-dimensional space, scales of space or divisions of space, and topologically or hierarchically arranged websites, databases and documents is disclosed.

BACKGROUND

Conventional visual displays on computer, mobile communications devices, personal digital assistant ("PDA") and television displays referring to time have used either simple digital numeric displays, or, when referring to time other than the present time, drop down menu boxes, scrolling, and radio buttons. Location selection is generally limited to a "drilling down" by selecting one member of a set, e.g., a county within a state.

Moreover, difficulties often arise when browsing or perusing hierarchically arranged documents, including web pages. Conventional GUI techniques either provide limited visibility into multiple layers of documents or subject topologies of websites or databases, or they provide tree structures which can be difficult to logically organize and display when there are large numbers of documents.

SUMMARY

In one aspect, a graphical user interface is implemented to include a display region, a first bounded region, and a second bounded region. The display region displays a user-generated result. The first bounded region circumferentially surrounds the display region, and the first bounded region includes one or more first-type graphical user interface elements. Each of the one or more first-type graphical user interface elements is selectively mapped to one or more first-type display data. The second bounded region circumferentially surrounds the first bounded region, and the second bounded region includes one or more second-type graphical user interface elements. Each of the one or more second-type graphical user interface elements is selectively mapped to one or more second-type display data. In addition, the user-generated result is based at least on a user activation of at least one of the first-type and second-type graphical user interface elements.

Implementations can include one or more of the following features. For example, the first bounded region can include a first concentric ring of one or more first geometric shapes, and the second bounded region can include a second concentric ring of one or more second geometric shapes. In addition, a granularity of categories associated with the first bounded region can be greater than the second bounded region. Alternatively, the granularity of categories associated with the first bounded region can be less than the second bounded region. Further, the first-type display data can be related to the second-type display data. For example, the second-type display data can include subcategories of the first-type display data. Alternatively, the first-type display data can include subcategories of the second-type display data. The graphical user interface can also include a plurality of bounded regions, including a third bounded region circumferentially surrounding the second bounded region. The third bounded region can include one or more third-type graphical user interface elements.

Implementations can also include one or more of the following features. For example, each of the first-type, second-type, and third-type graphical user interface elements can include a visual label characterizing the selectively mapped first-type and second-type display data. Also, an appearance of each of the first-type, second-type, and third-type graphical user interface elements can be altered in response to being activated. Further, the first-type, second-type and third-type graphical user interface elements can be chosen from a list consisting of a time, a date, a duration, a scale, a location, a scale of space, a span, and subject topologies of websites or databases. In addition, the first bounded region can be rotated around a central axis in response to an activation of one of the first-type graphical user interface elements in the first bounded region, and the second bounded region can be rotated around the central axis in response to an activation of one of the second-type graphical user interface elements in the second bounded region. The graphical user interface can further include one or more external graphical user interface elements located external to the first and second bounded regions. Hence, the user generated result can be further based on an activation of the one or more external graphical user interface elements. Also, access to the one or more first-type, second type, third-type and external graphical user interface elements can be controlled by a password.

Implementations can further include one or more of the following features. For example, The graphical user interface can include a plurality of user selectable subset selectors connected to at least one of the one or more first-type and second-type graphical user interface elements. The subset selectors can include a first subset selector and a second subset selector. Also, the first and second subset selectors can be used to cycle through the first-type and second-type display data to allow a user selection of at least one desired first-type or second-type display data. Further, the selection of the at least one desired first-type or second-type display data can cause at least one of the first-type and second-type graphical user interface elements to display a new label based on the selected first-type or second-type display data. The first subset selector can be used to cycle through the first-type and second-type display data in a first predetermined increment, and the second subset selector can be used to cycle through the first-type and second-type display data in a second predetermined increment. In some instance, the graphical user interface can include a third subset selector used to cycle through the first-type and second-type display data in a third predetermined increment. Two or more of the first, second, and third subset selectors can be selected in succession to select a desired set of display data.

In another aspect, a graphical user interface can be implemented to include a first bounded region including one or more first-type graphical user interface elements selectively mapped to one or more first-type data files. The graphical user interface can also include a second bounded region including one or more second-type graphical user interface elements selectively mapped to one or more second-type data files. The one or more first-type and second-type graphical user interface elements can be arranged on the first and second bounded regions based on a hierarchy of the one or more first-type and second-type data files.

Implementations can include one or more of the following features. For example, the graphical user interface can also include a label associated with each of the one or more first-type and second-type graphical user interface elements. The label can include information to identify at least one of the one or more first-type and second-type data files. The label can change corresponding to a change in the mapped first-type and second-type data files. Also, the first-type and second-type data files can include web pages, and the hierarchy can be related to a manner in which the first-type and second-type data files are linked. The information included in the label can further include a preview information to preview one or more web sites, and the preview information can be used to determine whether to navigate the previewed web sites. Further, each of the one or more first-type graphical user interface elements can be associated with a data category, and a selection of at least one of the one or more first-type graphical user interface elements can cause each of the one or more second-type graphical user interface elements to be mapped to at least one of the one or more second-type data files related to the data category associated with the selected first-type graphical user interface element.

Implementations can also include one or more of the following features. For example, each of the one or more first-type and second-type graphical user interface elements can be mapped to at least one of the one or more first-type and second-type data files based on a result of a web crawler, a search, or a match on a computer network. The result can include an algorithm to identify at least one of the one or more second-type data files as a subset of a selected first-type data file mapped to a selected first-type graphical user interface element. Alternatively, the result can include an algorithm to select the first-type and second-type display data files from a pool of available data files based on a relevance ranking assigned to the pool of data files. The relevance ranking can include a feedback mechanism to determine a frequency of each of the first-type and second-type data files being selected. Also, the relevance ranking can be generated by an expert or a celebrity. Alternatively, the relevance ranking can be based on a reference to a locale, a time, a time period, or an external condition. Further, the relevance ranking can be based on a value generated from a user payment related to a use of the first-type and second-type data files. In addition, the relevance ranking can include a chronological order of entry of the first-type and second-type data files into the pool of available data files. Also, the relevance ranking can be based on a random selection from the pool of available data files. Additionally, the information included with the label can include an advertisement or an email address.

In yet another aspect, a graphical user interface can be implemented to include a first bounded region including a plurality of first-type user interface elements. The graphical user interface can also include a second bounded region circumferentially surrounding the first bounded region. The second bounded region can include a plurality of second-type user interface elements. In addition, the graphical user interface can also include a first set of labels displayed on the plurality of first-type user interface elements. Further, a second set of labels can be displayed on the plurality of second-type user interface elements. The first and second sets of labels can also be related in a hierarchy.

Implementations can include one or more of the following features. For example, the first and second bounded regions can include a cascaded concentric rings of a geometric shape. Also, the graphical user interface can further include a plurality of user selectable subset selectors including a first subset selector and a second subset selector. The first and second subset selectors can be used to cycle through a plurality of sets of display data, and a user selection of a set of display data from the plurality of sets of display data can cause the first and second sets of labels to change based on the selected set of display data. In addition, the first subset selector can be used to cycle through the plurality of sets of display data in a first predetermined increment, and the second subset selector can be used to cycle through the plurality of sets of display data in a second predetermined increment. Also, the graphical user interface can include a third subset selector used to cycle through the plurality of sets of display data in a third predetermined increment. Further, the plurality of sets of display data can be selected from a pool of available display data based on an algorithm assigning a relevance ranking to the pool of display data. The relevance ranking can include a feedback mechanism to determine a frequency of each of the plurality of data files being selected. Alternatively, the relevance ranking can be determined by an expert or a celebrity. The relevance ranking can also include a reference to a locale, a time, a time period, or an external condition. Two or more of the first, second, and third subset selectors can be selected in succession to select a desired set of display data.

In another aspect, a graphical user interface for displaying a position data on a portable electronic device can be implemented to include a display region to display a plurality of target position data including a first target position data and a second target position data. The graphical user interface can also include a first bounded region circumferentially surrounding the display region. The first bounded region can include one or more first-type graphical user interface elements selectively mapped to a first position data. The graphical user interface can further include a second bounded regions circumferentially surrounding the first bounded region. The second bounded region can include one or more second-type graphical user interface elements selectively mapped to a second position data. In addition, the graphical user interface can include a first target indicator representing a visual representation of the first target position data, and a second target indicator representing a visual representation of the second target position data. The first-type and second-type position data can represent a scale of logical or physical position information.

The subject matter describe herein can be implemented using computer program products, tangibly embodied in information carriers, such as a CD-ROM, a DVD-ROM, and a hard disk. Such computer program products may cause a data processing apparatus to conduct one or more operations described herein.

In addition, the subject matter described herein can also be implemented as a system including a processor and a memory coupled to the processor. The memory may encode one or more programs that cause the processor to perform one or more of the method acts described herein.

The subject matter described herein provides many advantages. For example, the GUIs described herein allow for a user to rapidly access desired information. Alternatively, the GUIs can be implemented to allow a user to navigate or pre-navigate web pages or a list of related documents before actually performing the navigation. Also, the GUIs can be implemented to allow a user to identify a location or distance of one individual from another individual, place or event, or to see the final destination on a path prior to navigating down that path.

Further, the GUIs described herein are not limited in the range of use, and are accurate when referring to durations of time, boundaries of space, scales of space, divisions of space, or subject topologies of websites or databases. In addition, the GUIs described herein are readily compatible with the smaller display of cell phones, PDAs, and wireless devices.

BRIEF DESCRIPTION OF THE DRAWINGS

FIG. 5 (bottom) is an illustration of a GUI for referring to or setting a duration, division or scale of time.

Like reference symbols in the various drawings indicate like elements.

DESCRIPTION

Techniques for implementing a computer driven GUI are disclosed. As user input methods evolve and vary, the user input methods may become diverse based at least on the corresponding application or environment. On some systems, such as cellular phones, a user input can be accomplished by a user holding down a select key, a button or other suitable interfaces to rotate a ring of intervals or to rotate a highlighted segment through the ring of intervals. The rotation of the ring of intervals or the highlighted segments through the ring of intervals can be terminated by no further user input, a delay before the next user input, or a user input through a mouse click, stylus tap, or a press of a button. Such rotation to effectuate a user input can be caused by holding down a button or key for an appropriate predetermined duration until the ring of intervals rotates to the users desired selection.

User input may be accomplished by a variety of techniques including, for example, using an input device such as a mouse so that a cursor overlays GUI elements, which are then activated in response to clicking the input device. Different buttons on the mouse (e.g., left and right mouse buttons) can be mapped to different user input functions. Alternatively, a keypad or other input device may be used to rotate through and to select graphical user interface elements. On a visual display, such as a touch screen, a user input can be effectuated by a user's finger or a stylus touch. Alternatively, on a portable handheld devices, such as a cellular phone, a select button press can result in a user input. Voice recognition and software commands, directed or autonomous, can also create a user input. Further, in some implementations, language and number systems of a GUI can also vary.

In one aspect, a visual display and relationships among input elements, a user, a user interface, a user input, and a result independent of language, number systems, and the particular sets or sequences used in a GUI are disclosed. Also, the intervals or user input elements selected and the logical or actual physical distance, or lengths of time interval represented by the selected user input elements can be implemented to vary according to usage and size of a display screen. Further, the labels of the intervals can also be implemented to vary depending on the desired sets of user input elements to be utilized.

For example, a GUI representing space, scales of space, or divisions of space can be implemented to facilitate a molecular biologist to select the desired intervals or user input elements representing sets of proteins, amino acids, and nucleic acids. Alternatively, a GUI can be implemented to facilitate an astronomer to select the desired intervals or user input elements representing sets of planets, solar systems, and galaxies.

Figure 1:
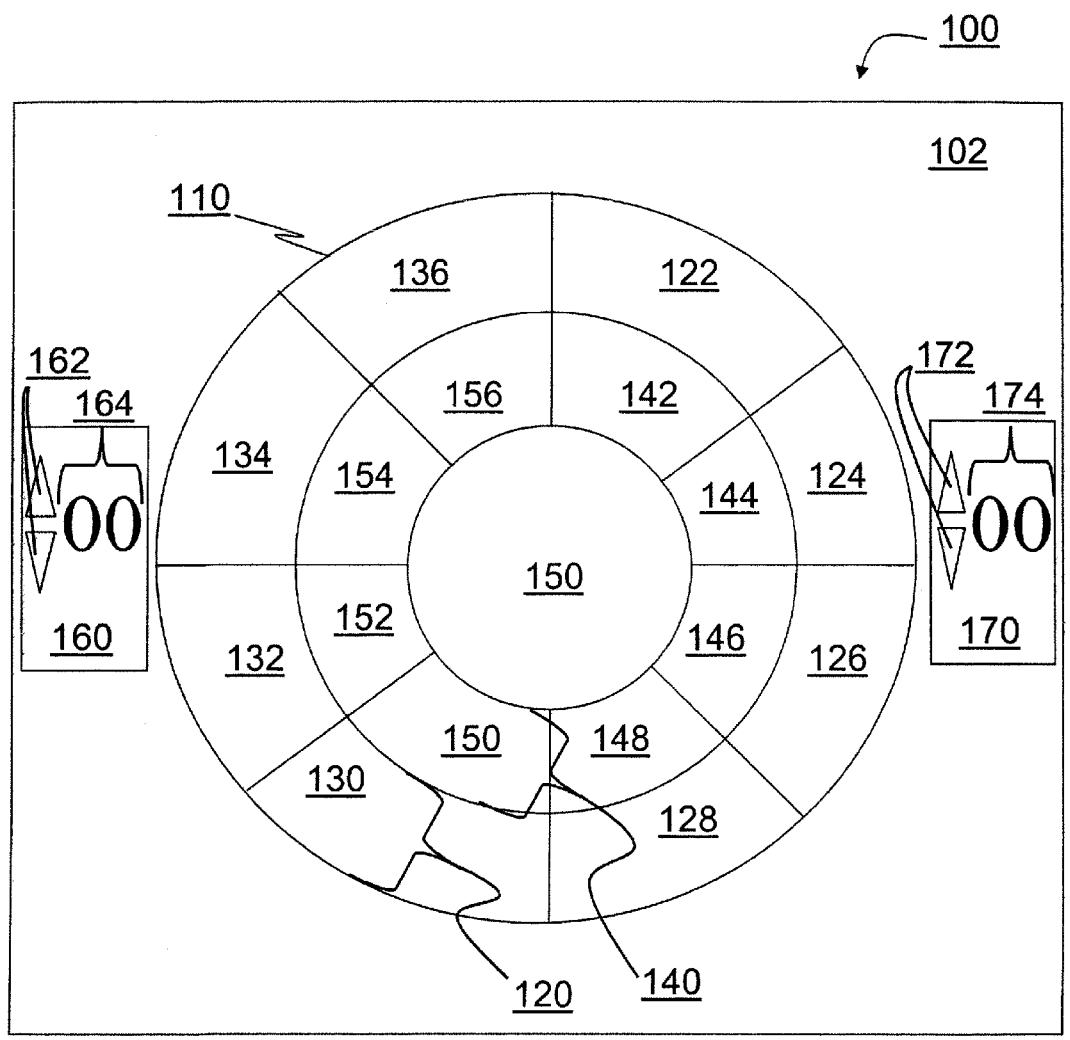
FIG. 1 is an illustration of a GUI with example GUI elements.

FIG. 1 depicts a GUI 100 displayed on a display area 102. The GUI 100 can be implemented to facilitate user input to set a visual representation of a data or set of data. The GUI 100 can also be implemented to facilitate user navigation of data or data files including documents, web pages, and multimedia content. The GUI 100 can be implemented to utilize images and/or a user selectable visual elements to facilitate an interactive system to receive user input and produce a user desire result and/or effect based on the received user input.

The GUI 100 can include multiple user selectable visual elements. For example, FIG. 1 shows the GUI 100 that includes a first visual element 110, a second visual element 160, and a third visual element 170. The first visual element 110 may be centrally located and function as the main visual element. The first visual element 110 can be implemented to include multiple layers of a geometric shape or a combination of geometric shapes. While FIG. 1 depicts the first visual element 110 using multiple concentric rings 120 and 140, other suitable geometric shapes including a rectangle, triangle, a square, and various polygons in 2D or 3D can be implemented. The first visual element can include a first concentric ring 120, a second concentric ring 140, and a center display 150. The first concentric ring 120 can further include multiple first-type display regions. For example, FIG. 1 depicts eight first-type display regions 122, 124, 126, 128, 130, 132, 134, and 136 disposed on the first concentric ring 120. The second concentric ring 140 can also include multiple second-type display regions 142, 144, 146, 148, 150, 152, 154, and 156 disposed on the second concentric ring 140. Each of the first-type and second type display regions can include a label (not shown) and a first-type or second-type user selectable GUI element (not shown).

Each label corresponding to each of the first-type and second type display regions can be implemented to identify the corresponding input function mapped to the GUI element. Alternatively, each label can be used to identify the corresponding data or data file mapped or linked to the GUI element. Based on a user selection of one of the first-type and second-type GUI elements, a result can be displayed on the center display 150.

In addition, the input function, data, or data file mapped or linked to each of the first-type and second type GUI elements can be related to one another. For example, each of the first-type GUI elements can be mapped or linked to input functions, data, or data files related to a primary category or a root category of a user's choosing. Then each of the second-type GUI elements can be mapped or linked to input functions, data, or data files related to a subcategory of the primary category. Further, a user selection of one of the first-type GUI elements can cause the second-type GUI elements to map or link to a different input function, data, or data file related to a subcategory corresponding to the selected first-type GUI element. Each of the labels can be altered to populate each of the first-type and second-type display regions with a new label corresponding to the newly linked or mapped input function, data, or data file. The alteration of the labels can be accomplished manually by a user selecting from a list or dynamically using an automated algorithm.

Further, the second visual element 160 and the third visual element 170 can be implemented to supplement user input through the first visual element 110. The second visual element 160 can include multiple selectors 162 and a display region 164. Likewise, the third visual element 170 can also include multiple selectors 172 and a display region 174.

Figure 2:
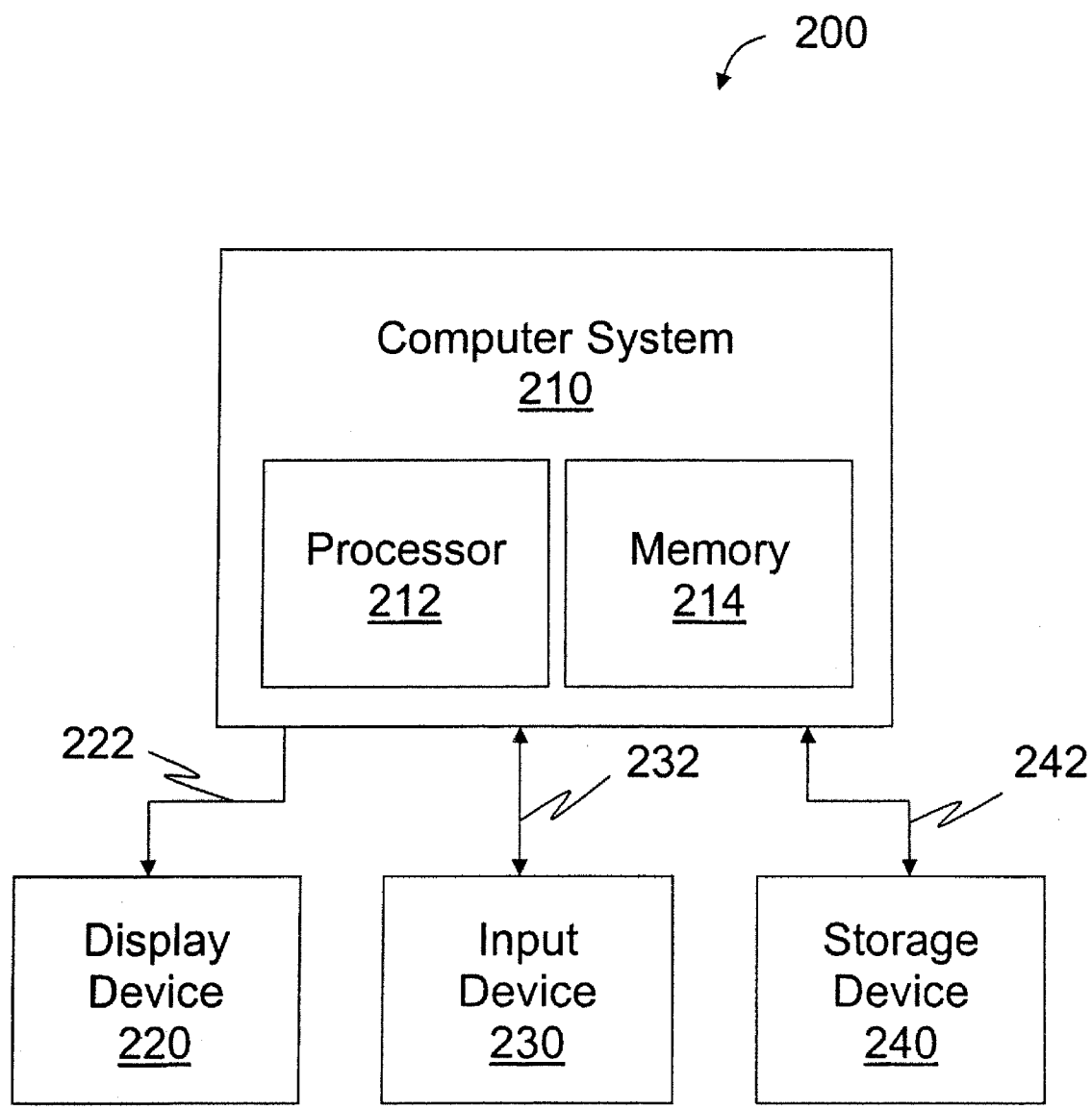
FIG. 2 is a block diagram of a system for generating and displaying a GUI.

FIG. 2 is a functional diagram of a system 200 for providing a GUI to process a user input. The processed user input can be used to execute an input function and/or locate a data file to generate a user desired result. The system 200 can include at least a computer system 210, a display device 220, an input device 230, and a storage device 240. The computer system 210 can include at least a processor 212 and a memory 214. The processor 212 can include a central processing unit (CPU), or other suitable processor/hardware such as an application specific integrated circuit (ASIC). The memory 214 can be a volatile or non-volatile memory unit used to store and execute a GUI generation process (not shown). The Computer system can be communicatively coupled to at least a display device 220, an input device 230, and a storage device 240 through appropriate communication channels 222, 232, and 242. The communication channels 22, 232, and 242 can provide either unidirectional or bidirectional communications, and can be combined into a single, shared communication channel (e.g., a bus network). In some implementations, the system 100 can be implemented using software only or a combination of computer hardware and software.

Figure 3:
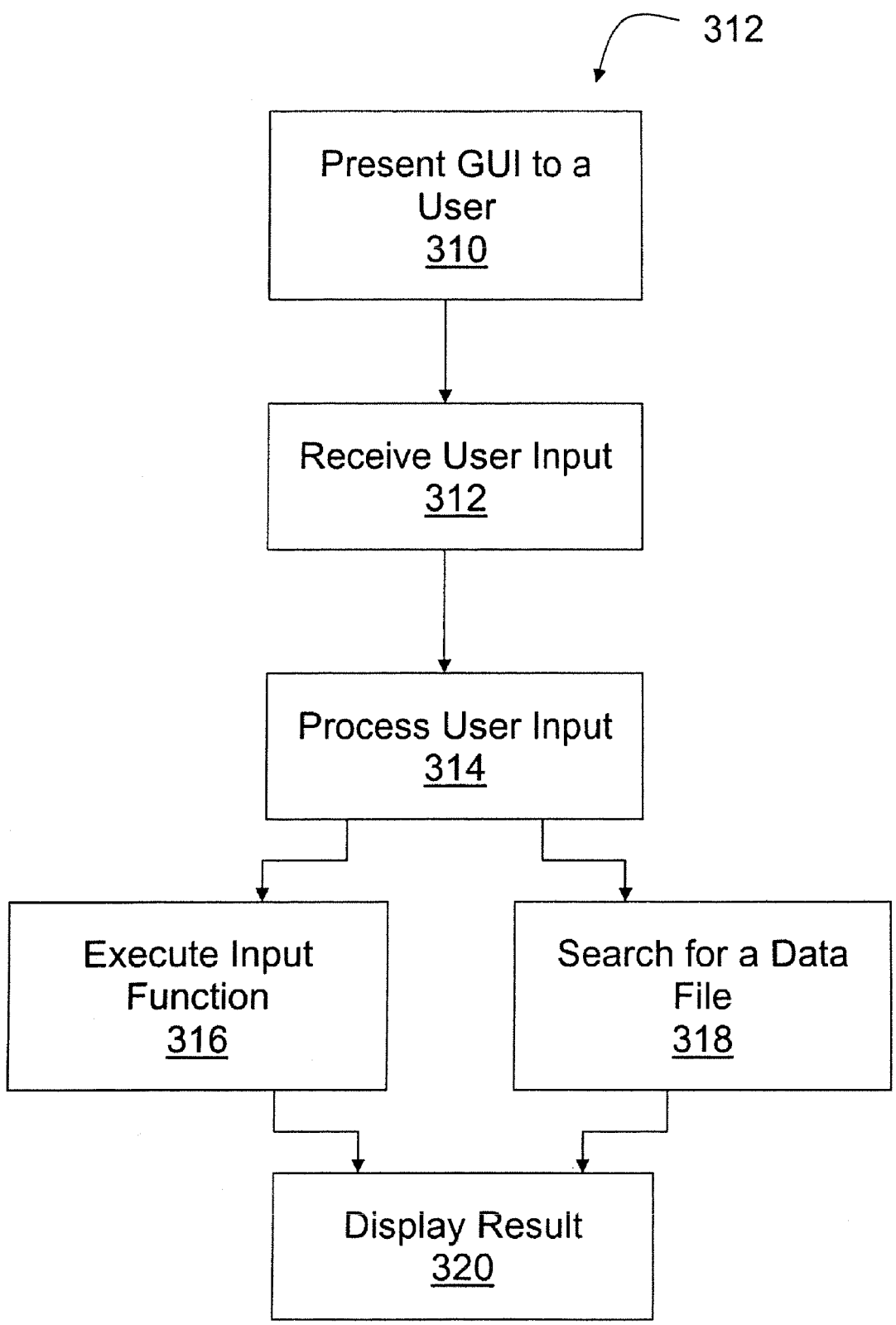
FIG. 3 is a flow chart of a process for processing user input.

FIG. 3 is a flowchart illustrating a process 300 of presenting a GUI to a user for receiving user input and processing the received user input. The processor 212 executes a GUI generating process (not shown) stored in the memory 214 to display a GUI (e.g. GUI 100) on the display 220. The displayed GUI is present (310) to a user. A user interacts with the displayed GUI using the input device 230 and activates one or more of the GUI elements. Based on the user interaction, user input is received (210) by the computer system 210. The received user input is processed (314) by the processor 212. Based on the processed user input, a determination is made (316, 318) by the processor 212 to either execute one more input functions or search for one or more data files. If the user input is determined to relate to a desired input function, the corresponding input function is executed (320) and the result of the executed input function is displayed. Alternatively, if the user input is determined to related to a search for a data file, the requested one or more data files are searched for at the specified location, and the result of the search is displayed (320). In executing the one or more input functions or searching for the one or more data files, a storage device 240 can be searched.

The input functions can include functions to set time, date, duration of time, etc. as described further with respect to FIGS. 4-7 below. The search for desired one or more data files can include a search for a document or navigating through web sites and pages as described further with respect to FIGS. 8-12 below. Displaying the result in response to the execution of user input or search for data files can include various display processes. For example, a label can be displayed for each of the GUI elements of the GUI to identify the input function executed or the data file searched for and found. In addition, the result of executing the input function can be displayed in a display region. Further, the one or more data files searched for and found can be displayed in full or in part (e.g. the title of the data file).

Various aspects of the GUI 100 and the system 200 for providing the GUI 100 will be further described with respect to FIGS. 4-12 below. For example, various methods or processes can be implemented to populate each of the first-type and second-type display regions with an appropriate label to facilitate user interaction with the GUI 100 in obtaining a desired result in an efficient manner.

The subject matter described herein can involve more than just a single user. For example, the subject matter described herein allows for an image on a visual display and/or a set of visual objects to be used by an external program or person to set a time not referring to the present time. The image on a visual display and/or a set of visual objects may also be used by an external program or person to set a duration, scale or division of time or to set a time referring to a time in the external world that is not the present time. Such images, displays, or objects may also be used by an external program or person to set a time referring to a duration, scale, or division of time in the external world.

Furthermore, the subject matter described herein allows for an image on a visual display and/or a set of visual objects to be used by an external program or person to set a time not referring to the present time that can be utilized as it appears in its original form without user input where that input causes the user interaction area to enlarge. Such images, displays, or objects can also be used by an external program or person to set a duration, scale or division of time that can be used as it appears in its original form without user input where that input causes the user interaction area to enlarge. They can be used by an external program or person to set a time not referring to the present time that can be utilized as it appears in its original form without user input where that input causes the extension of the visual user interaction area, or used by an external program or person to set a duration, scale or division of time that requires user input to extend the visual user interaction area.

Additionally, the subject matter described herein allows for an image on a visual display and/or a set of visual objects to be used by an external program or person to set a time not referring to the present time that utilizes intervals of forms or shapes to receive user input; or used by an external program or person to set a duration, scale or division of time that utilizes intervals of forms or shapes to receive user input. Furthermore, the images, displays, and/or objects can used by an external program or person to set a time not referring to the present time that uses a radial or circular visual image to receive user input or used by an external program or person to set a duration, scale or division of time that uses a radial or circular visual image to receive user input. They can also be used by an external program or person to set a time not referring to the present time that uses a radial or circular visual image to receive user input in conjunction with a digital numeric display showing the result of that input.

Such images, displays, and/or objects can also be used by an external program or person to set a time referring to the present time that uses a radial or circular visual image to receive user input in conjunction with a digital numeric display showing the result of that input; or used by an external program or person to set a duration, scale or division of time that uses a radial or circular visual image to receive user input in conjunction with a digital numeric display showing the result of that input. They can also be used by an external program or person to set a time not referring to the present time by means of the display of sequential intervals; or used by an external program or person to set a time referring to the present time by means of the display of sequential intervals.

Further, such images, displays, and/or objects can be used by an external program or person to set a duration, scale or division of time by means of the display of sequential intervals; used by an external program or person to set a time not referring to the present time by means of the display of sequential intervals which are rotated through in sequence; or used by an external program or person to set a time referring to the present time by means of the display of sequential intervals which are rotated through in sequence. The images, displays, and/or objects can also be used by an external program or person to set a duration, scale or division of time by means of the display of sequential intervals which are rotated through in sequence.

Figure 4:
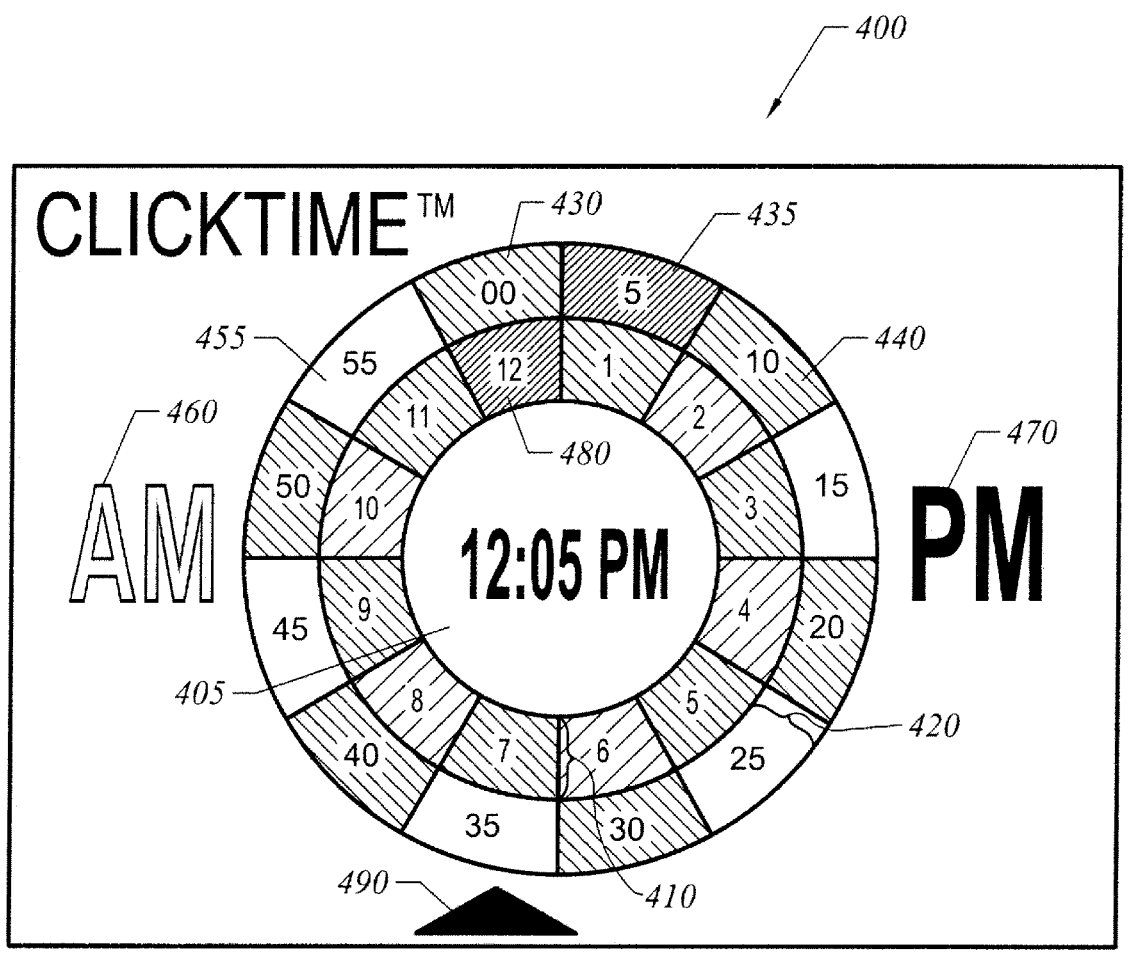
FIG. 4 is an illustration of a GUI for referring to or setting a time.

FIG. 4 depicts a GUI 400 displayed on a computer driven display screen for displaying, selecting, and/or referring to a time of day. The GUI 400 comprises a center display portion 405, an inner concentric ring 410, an outer concentric ring 420, an "AM" selector 460 and a "PM" selector 470. The center display portion 405 dynamically displays the result of a user input via one or more user input elements of the GUI 400. The center display portion 405 displays the result to indicate the time of day including the hour, minute, and an indication of either "AM" or "PM". The inner concentric ring 410 includes multiple user selectable hour elements. FIG. 4 shows at least twelve user selectable hour elements with each hour element representing a one-hour time duration. In this configuration, each hour element can be selected once to input a desired hour. The outer concentric ring 420 includes multiple user selectable minute elements. FIG. 4 shows at least twelve user selectable minute elements with each minute element representing a five-minute time duration. In this configuration, each user selectable minute element can be selected up to five times by a user. For example, the zero minutes element 430 labeled "00" can be selected up to five times to input 00, 01, 02, 03, or 04 minutes.

In some implementations, the total number of hour elements and the minute elements can be varied based on considerations such as the display options desired or the time intervals corresponding to the elements. For example, FIG. 4 shows the minute elements representing a five minute interval to facilitate user input of time based on a user schedule or appointment. However, different minute intervals may be desired and implemented. In addition, the GUI 400 can be implemented as a 24-hour clock having 24 hour elements with each hour element representing an one-hour time duration. In such implementation, the time is displayed in 24-hour format without the "AM" or "PM" indication displayed.

In use, a user can select the desired user selectable element (e.g., hour or minute) by first selecting the element closest to desired time interval and then adding or subtracting a time interval until the desired time interval is selected and inputted. Advancing or adding a time interval can be implemented using a left mouse click. Subtracting a time interval can be implemented using a right mouse click. For example, if a user desires to select seven minutes, the user can select the five-minute element ("5") 435 via a left mouse click to input five-minutes. Two additional user selections of the five-minute element 435 via the left mouse click can add two additional minutes in one minute increments to result in a user input of seven minutes. Alternatively, the user can select the ten-minute element 440 via a left mouse click to select or input ten minutes. Three additional user selections of the ten-minute element 440 via a right mouse click can subtract three minutes in one minute decrements to result in a user input of seven minutes.

In FIG. 4, since twelve hour elements are implemented, a user can directly select a desired hour element on the inner concentric ring 410 to pick the desired hour without subtracting or adding hours. For example, a user selection of the twelfth-hour element 480 results in an input selection of the twelfth hour and a corresponding display of "12:- -" on the center display portion 405.

A user selection of a desired minute as shown in FIG. 4 can be effectuated by selecting a desired minute element on the outer ring 420 to pick the desired five-minute interval as needed. Each minute-element represents five user selectable minutes in twelve segments starting from "00" to "55" in five minute increments. For example, the zero-minute element ("00") 430 allows the user to select from zero minute to four minute in one minute increments. Likewise, the fifty-five-minute element ("55") 455 allows the user to select from fifty-five minute to fifty-nine minute in one minute increments.

A first user selection of the zero-minute element 430 can result in an input selection of zero minutes and a corresponding display of "- -:00" on the center display portion 405. A second user selection of the zero-minute element 430 can result in an input selection of one-minute and a corresponding display of "- -:01" on the center display portion 405. A third user selection of the zero-minute element 430 can result in an input selection of two minutes and a corresponding display of "- -:02" on the center display portion 405. A fourth user selection of the zero-minute element 430 can result in an input selection of three minutes and a corresponding display of "- - :03" on the center display portion 405. A fifth user selection of the zero-minute element 430 can result in an input selection of four minutes and a corresponding display of "- -:04" on the center display portion 405. In addition to selecting the desire hour and minute, the user can also click on the "AM" 460 or "PM" 470 elements to select the desired morning or afternoon time.

As shown in FIG. 4, the outer concentric ring 420 has a finer granularity or precision (i.e., minute-intervals) than the inner concentric ring 410 (i.e., hour-intervals). Alternatively, the outer ring 420 can be implemented as a subset of the inner ring 410 (e.g., a minute is a subset of an hour). However, the outer concentric ring 420 and the inner concentric ring 410 can be implemented using various display options. For example, in some implementations, the inner ring 410 can be implemented to have a finer granularity or precision than the outer ring 420.

Further, a visual appearance of each of the selection elements such as associated with the twelfth-hour element 480, the five-minute element 435, the "PM" selector 470, and other selection elements can be altered in response to a user activating or selecting these user selectable elements. For example, a user selection of one of the user selectable elements (e.g., a minute element or an hour element) can be indicated by highlighting the user selected element.

Figure 5:
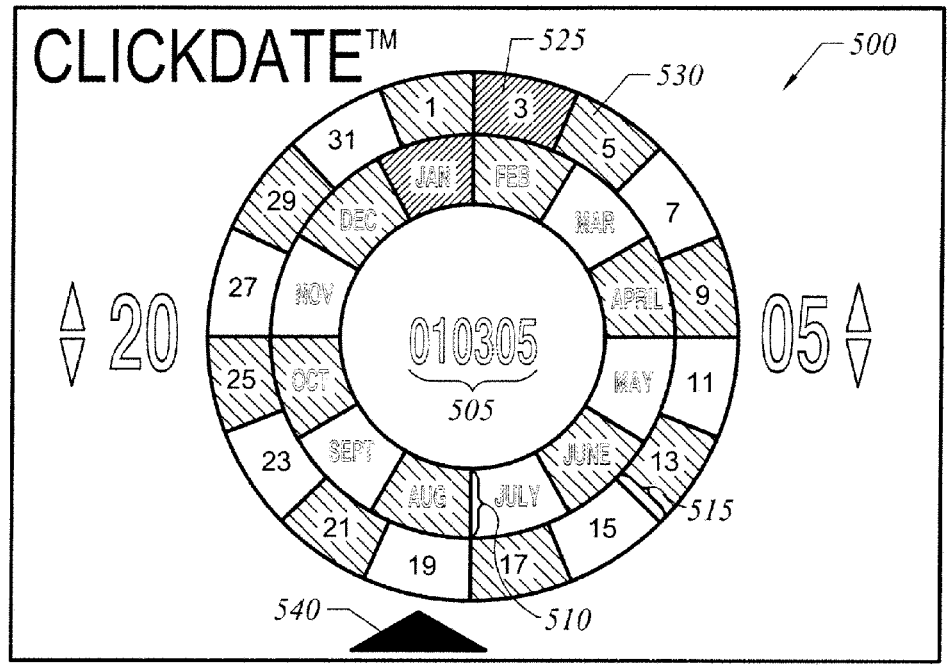
FIG. 5 (top) is an illustration of a GUI for referring to or setting a date.
Figure 5:
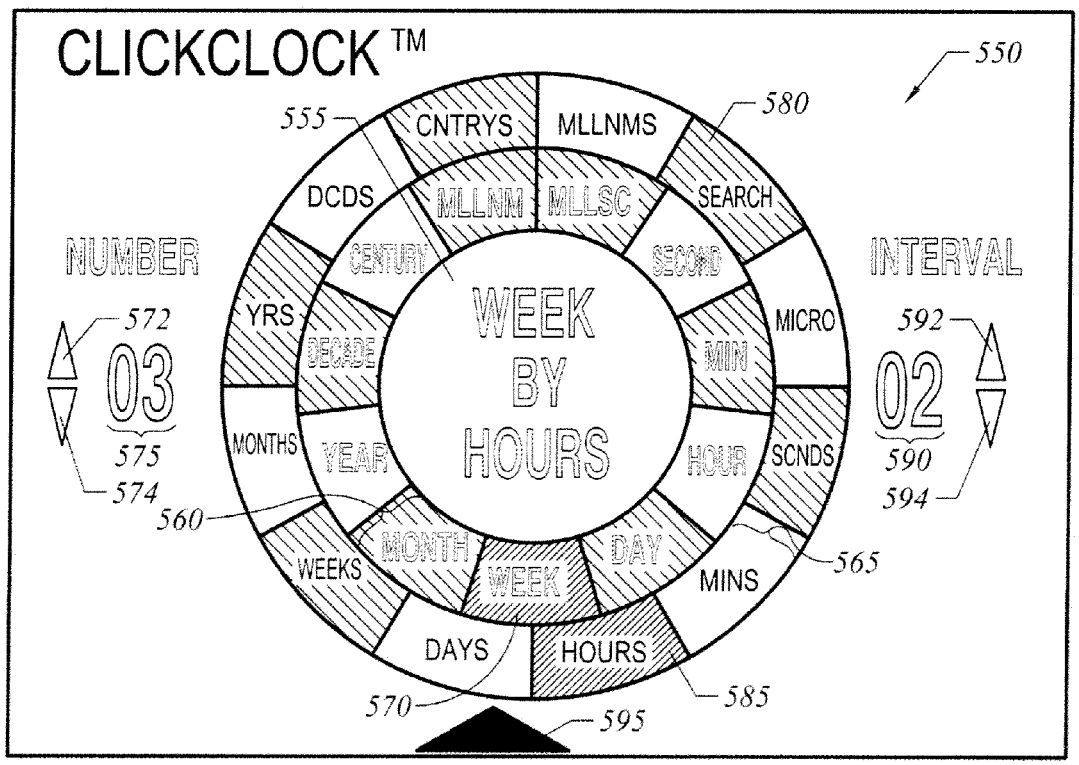

FIG. 5 (top) depicts a GUI 500 displayed on a computer-chip-driven display screen, for displaying, selecting, and/or referring to a date. The GUI 500 comprises a center display portion 505, an inner concentric ring 510, and an outer concentric ring 515. The center display portion 505 displays the month, day, and year in a six-digit, "MMDDYY" format. The inner concentric ring 510 includes at least twelve user selectable month-intervals, with each month-interval representing a one month date duration. The outer concentric ring 515 includes at least sixteen user selectable day-intervals, with each day-interval representing a two-day time duration.

In some implementations, the central display portion 505 can be implemented to display the date in other suitable formats. For example, the date can be displayed in a six-digit DDMMYY format, a six-digit format with "dashes" (MM- DD-YY) or "back slashes" (MM/DD/YY), or an eight-digit (MMDDYYYY or DDMMYYYY) format. Further, the month can be spelled out instead of using numerical representations. Also, the total number of month-intervals and the day-intervals can be varied based at least on the display options or the length of the intervals desired.

A user can select a desired month element on the inner concentric ring 510 to pick the desired month. Since FIG. 5 (top) shows all twelve months represented, the user can directly select the desired month without adding or subtracting a month. In addition, the user can select a desired day element on the outer ring 515 to pick the desired two-day-interval. If in FIG. 5 (top), the user desires to select the fourth day, the user can select the day-three element 525 to select or input the third day via a left mouse click. A second user selection of the day-three element 525 via a left mouse click can advance one day to result in a user selection of the fourth day. Alternatively, the user can select the day-five element 530 via a left mouse click to select or input the fifth day. A second user selection of the day-five element 525 (this time by a right mouse click) can subtract one day to result in a user selection or input of the fourth day as desired.

FIG. 5 (bottom) depicts a GUI 550 displayed on a computer-chip-driven display screen, for displaying, selecting, searching, and/or referring to a schedule for a user selected date. The GUI 550 includes a center display portion 555, an inner concentric ring 560, an outer concentric ring 565, number counters 572 and 574, a number display portion 575, interval counters 592 and 594, and an interval display portion 590.

The center display portion 555 displays the schedule for a user selected number of time periods (e.g., days, weeks, months, years, etc.)
displayed in user selected intervals. The inner concentric ring 560 includes at least eleven user selectable time-periods, with each time-period representing a different magnitude of time. For example, the time-periods include representations of millisecond (MLLSC), second (SECOND), minute (MIN), hour (HOUR), day (DAY), week (WEEK), month (MONTH), year (YEAR), decade, (DECADE), century (CENTURY), and millennium (MLLNM). The outer concentric ring 565 includes at least eleven user selectable time-intervals, with each time-interval representing different user selectable time magnitudes for displaying the schedule during the user selected time period. For example, the time-intervals include representations of microseconds (MICRO), seconds (SCNDS), minutes (MINS), hours (HOURS), days (DAYS), weeks (WEEKS), months (MONTHS), years (YRS), decades (DCDS), centuries (CNTRYS), and millenniums (MLLMS). In addition, the outer-intervals include a search-interval element for searching for a desired schedule.

To display a desired schedule during a user selected time-period displayed in a user selected time-interval, a user can select one of the eleven time-periods from the inner concentric ring 560 to select the desired time magnitude for displaying the schedule. For example, selecting the WEEK time-period element 570 on the inner concentric ring 560 results in a user input of a time magnitude in weeks, and the center display 555 displays "WEEK" in response to the user selection. The user can also vary the number of weeks by interfacing with the number counters 572 and 574 located on the left side of the GUI 550. FIG. 5 (bottom) shows a user selection of "03" weeks.

Interfacing with the duration counter 572 (e.g., by left mouse clicking on the counter) increases the duration selected, and the duration counter 574 decreases the duration. A user selection of the desired duration is displayed to the right of the duration counters 572, 574 in the duration display portion 575. For example, a user selection of "03" after selecting "WEEK" results in an input of a three-week time period. The selected three-week period can be subdivided in a user selected time-interval for displaying the schedule. For example, the user can select a desired time-interval from the eleven time-intervals on the outer concentric ring 565 for displaying the schedule during the user selected three-week period.

For example, a user selection of the "HOURS" time-interval element 585 results in a user input for subdividing the user selected three-week period in hourly intervals. The length of the hourly intervals can be varied by a user interfacing with the interval counters 592 and 594 (e.g., by left mouse clicking on the counters) located on the right side of the GUI 550. A user selection of the interval counter 592 increases the length of the time-interval (hourly interval in this example) and the interval counter 594 decreases the time-interval. The result of a user selection of the time-interval is displayed to the right side of the interval counters 592, 594 on the interval display portion 590. For example, a user selection of a two-hour time-interval results in a user input for displaying a schedule for a three week time-period in two hour time-intervals.

In some implementations, one or more user inputs as related to FIGS. 1-5 above can be accomplished by holding down a user input element, such as a button or key (e.g., 490, 540, and 595) to rotate a desired ring of intervals 410, 420, 510, 515, 560, and 565. For example, the user selection of a button key 490 can activate the rotation input mode. Once activated, the next user input element selected can become an originating element to begin user input. The originating element is the initial input element. A user activation of element 480 (e.g., via left mouse click) inputs twelfth hour ("12") as the initial input. Then the user can increase the time in hours by grabbing any of the input elements on the inner concentric ring 410 (e.g., via a left mouse click and holding the left mouse click) and rotating the inner concentric ring 410 by moving the mouse in clockwise or counter clockwise direction (with the left mouse button still depressed). A particular user input can be terminated by no further user input (e.g. releasing the left mouse button), a delay before the next user input, or by a user interfacing with a button, a mouse, a joystick, or a stylus. The process of rotating a ring of interval will be described further with respect to FIGS. 6-7 below.

Figure 6:
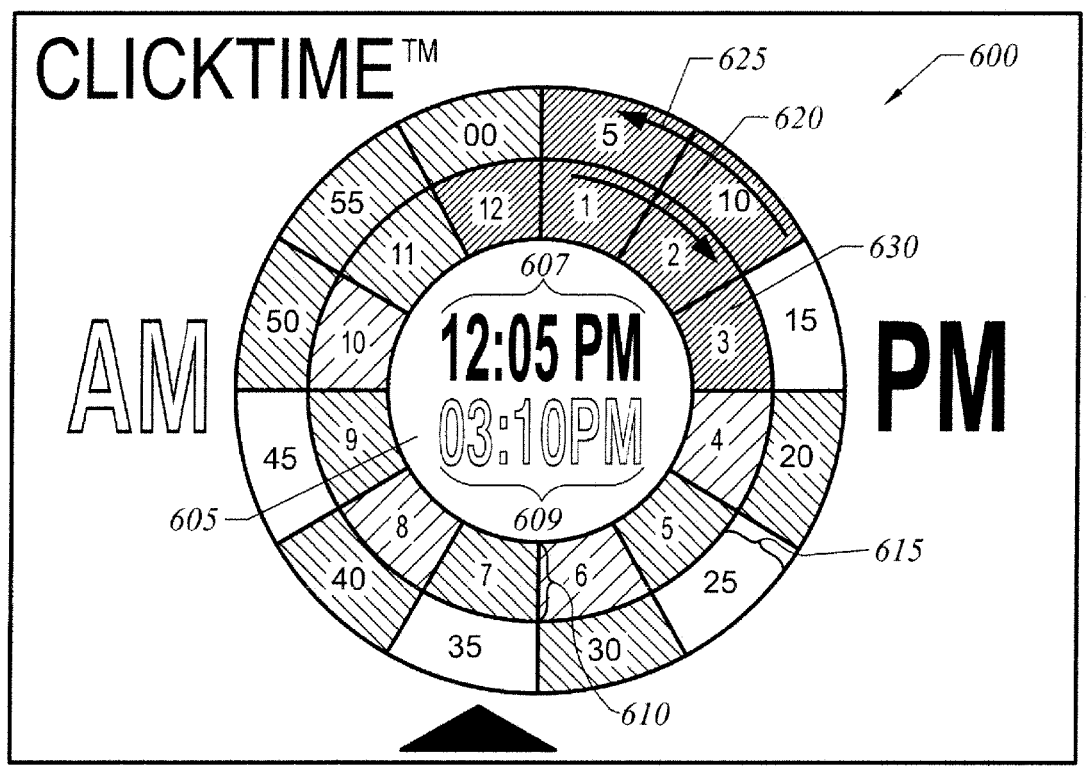
FIG. 6 is an illustration of a GUI for setting a duration of time.

FIG. 6 depicts a GUI 600 displayed on a computer driven display screen for displaying, selecting, or referring to a duration, a scale, or a division of time. Similar to the GUI 400 described in FIG. 4 above, the GUI 600 includes a center display portion 605, an inner concentric ring 610, an outer concentric ring 615, an "AM" selector, and a "PM" selector. The center display portion 605 displays a user selected time duration, scale, or division by displaying a start time (a lower limit) 607 and an end time (an upper limit) 609. The inner concentric ring 610 includes at least twelve user selectable hour-intervals with each hour-interval representing a one hour time duration. The outer concentric ring 615 also includes at least twelve user selectable minute-intervals with each minute-interval representing a five-minute time duration.

In some implementations, the time is displayed in 24-hour format without the "AM" or "PM" indication displayed. Also, the total number of hour-intervals and the minute-intervals can be varied based at least on the display options desired or the length of the intervals. For example, the GUI 600 can be implemented as a 24-hour clock having 24-hour-intervals with each hour-interval representing a one-hour time duration.

A user can input a user desired start time 607 via a mouse click or other suitable user interface techniques as described with respect to FIG. 4 above. The most recent user selected input, for example, an hour-interval and/or a minute-interval can be highlighted to indicate the interval as an originating element in the corresponding inner or outer concentric rings 610, 615. The originating element designates the starting user input value (e.g., user selection of element 630 inputs twelfth hour "12" as the starting hour input) for increasing or decreasing the input value. For example, if one of the hour-intervals is highlighted, the highlighted hour-interval becomes an originating element to allow the user to rotate the inner concentric ring 610 by dragging the highlighted hour-interval in a clockwise 620 or a counterclockwise 625 circular direction to vary a duration, a scale, or a division of time. For example, each rotation can advance the end time in 12-hour increments and the resulting end time 609 is displayed in the center display portion 605. For example, two rotations in the clockwise direction 620 can advance the end time 609 by twenty-four hours, and four rotations in the clockwise direction can advance the end time 609 by two days. Likewise, the outer concentric ring 615 can be rotated in a similar manner.

In some implementations, the user can set a duration, a scale, or a division of time in number of days as described in FIG. 7 below. In some implementations, a pair of displays can be implemented to set the start time 607 or date in a first display (not shown) and the end time 609 or date in a second display (not shown).

Figure 7:
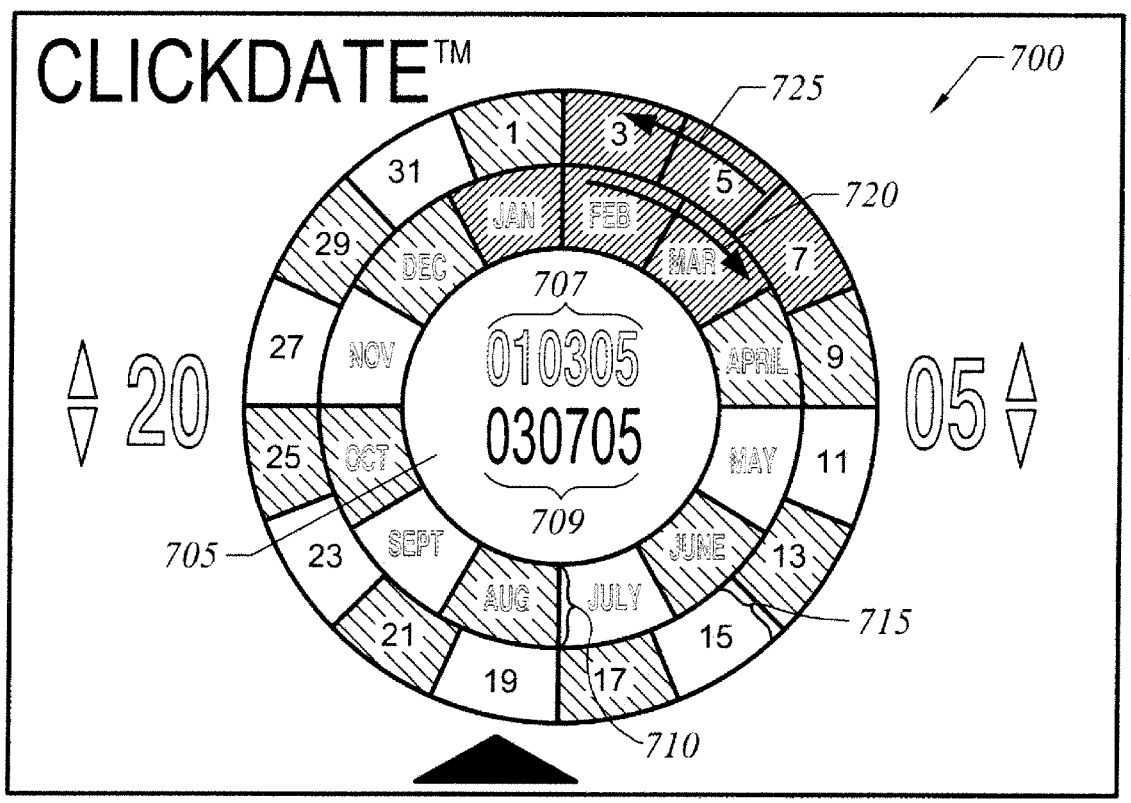
FIG. 7 is an illustration of a GUI for setting a duration of date.

FIG. 7 depicts a GUI 700 displayed on a computer-chip-driven display screen for displaying, selecting, and/or referring to a duration of dates. Similar to the GUI 500 as described in FIG. 5 (top) above, the GUI 700 includes a center display portion 705, an inner concentric ring 710, and an outer concentric ring 715. The center display portion 705 displays the month, day, and year in a six-digit, MMDDYY format. Included in the center display portion 705 is a start date 707 (a lower limit) and an end date 709 (an upper limit). The inner concentric ring 710 includes at least twelve user selectable month-intervals, with each month-interval representing a one month date duration. The outer concentric ring 715 includes at least sixteen user selectable day-intervals, with each day-interval representing a two-day time duration.

In some implementations, the central display portion 705 can be implemented to display the date in other suitable formats. For example, the date can be displayed in a six-digit DDMMYY format, a six-digit format with "dashes" (MM-DD-YY) or "back slashes" (MM/DD/YY), or an eight-digit (MMDDYYYY or DDMMYYYY) format. Further, the month can be spelled out instead of using numerical representations. Also, the total number of month-intervals and the day-intervals can be varied based at least on the display options or the length of the intervals desired.

In use, a user inputs a user desired start date 707 via a mouse click or other suitable interface techniques as described with respect to FIG. 5 (top) above. The most recent user selected input element, for example, a month-interval and/or a day-interval is highlighted to indicate the selected interval as an originating element in the corresponding inner or outer concentric rings 710, 715. For example, if one of the day-intervals is selected and highlighted, the highlighted day-interval becomes an originating element to allow the user to rotate the inner concentric ring 710 by dragging in a clockwise 720 or a counterclockwise 725 circular directions to vary a duration, a scale, or division of time in months. For example, each rotation in the clockwise direction 720 can advance the end date 709 by one year, and each rotation in the counterclockwise direction 725 can reduce the end date 709 by one year. Two rotations in the clockwise direction 720 can advance the end date 708 by two years; and four rotations in the clockwise direction 720 can advance the end date 708 by four years. The outer concentric ring 715 can also be rotated to advance or decrease the end date.

In some implementations, a pair of displays can be implemented to set the start time 607 or date 707 in a first display (not shown) and the end time 607 or date 707 in a second display (not shown). In addition, in some implementations both of the inner and outer concentric rings 710, 715 can be rotated together in the clockwise 720 or the counterclockwise 725 direction. If both inner and outer concentric rings 710 and 715 are rotated together in a clockwise direction, one of the rings 710, 715 may need to be rotated back in the reverse, counterclockwise direction 725 to designate the correct time.

The time visual display (e.g., FIG. 6) and the date visual display (e.g., FIG. 7) can be implemented separately or paired together. If a user desired duration is longer than a day but less than a month, two time visual displays implemented to indicate time may be paired. If a user desired duration is longer than a month but less than a year, two date visual displays implemented to indicate date may be paired.

In some implementations, a user selection of a second time or date can result in signaling the system to highlight the second time or date selected along with the space in between the first and second selections. Yet in other implementations, in general, any set, subset, superset or combination thereof may be used to accomplish the purpose at hand.

Figure 8:
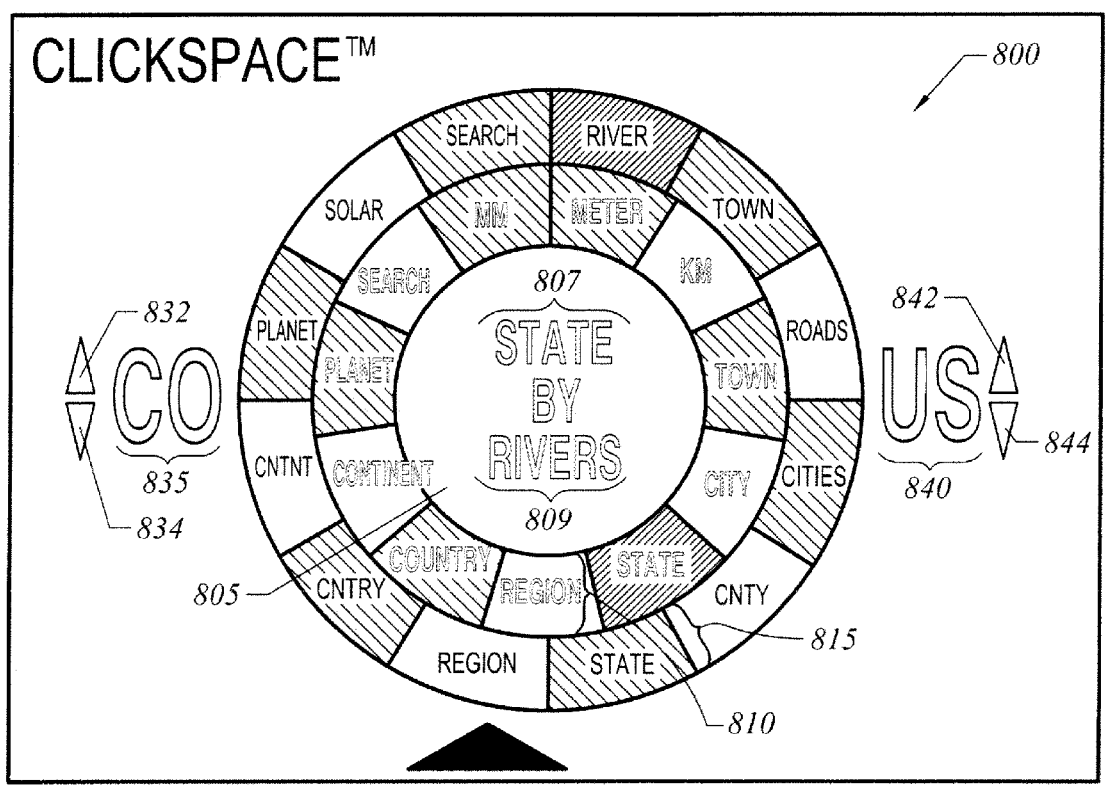
FIG. 8 is an illustration of a GUI for referring to a location.

FIG. 8 depicts a GUI 800 displayed on a computer-chip-driven display screen for displaying, selecting, or referring to a subset of a bounded location. For example, a map of a user selected subset of a bounded location can be searched and displayed using the GUI 800. The GUI 800 comprises a center display portion 805, an inner concentric ring 810, and an outer concentric ring 815. The center display portion 805 displays the user selected subset of a bounded location. The inner concentric ring 810 includes at least eleven user selectable location-intervals representing at least the following: millimeter (MM), meter (METER), kilometer (KM), town (TOWN), city (CITY), state (STATE), region (REGION), country (COUNRY), continent (CONTINENT), planet (PLANET), and search (SEARCH). The outer concentric ring 815 includes at least twelve user selectable sub-location-intervals representing at least the following: river (RIVER), town (TOWN), roads (ROADS), citites (CITIES), county (CNTY), state (STATE), region (REGION), country (CNTRY), continent (CNTNT), planet (PLANET), solar system (SOLAR), and search (SEARCH).

A user can select a location-interval from the inner concentric ring 810, and the corresponding user selection is displayed on a location display portion 807 of the center display portion 805. For example, FIG. 8 shows a user selection of "STATE" from the inner concentric ring 810. The user can specify a particular state in the United States by interfacing with first location selectors 832 and 834, and the result of the user selection is displayed on a first location selector display portion 835. Pressing or mouse clicking (e.g., via a left mouse button) on the first location selector 832 can advance the displayed location in a ascending alphabetical order. Conversely, pressing or mouse clicking on the location selector 834 advances the displayed location in a descending alphabetical order. FIG. 8 depicts a user selection of Colorado (CO).

The user selected location (state of Colorado in the example shown in FIG. 8) can be subdivided by a user selecting a desired sub-location-interval from the outer concentric ring 815. A user selection of "RIVER" displays the corresponding sub-location on a sub-location display portion 809 in the center display portion 805. The above combination of user selections can allow the user to search and view a map of all rivers in the state of Colorado. A second location selectors 842 and 844 can also be provided to select a location of a higher hierarchy than the first location selectors 832 and 834. A second location display portion 840 shows that Colorado is a state in the United States (US). Different countries can be selected by activating second input selectors 842 and 844 to flip through a list of countries in alphabetical order.

Figure 9:
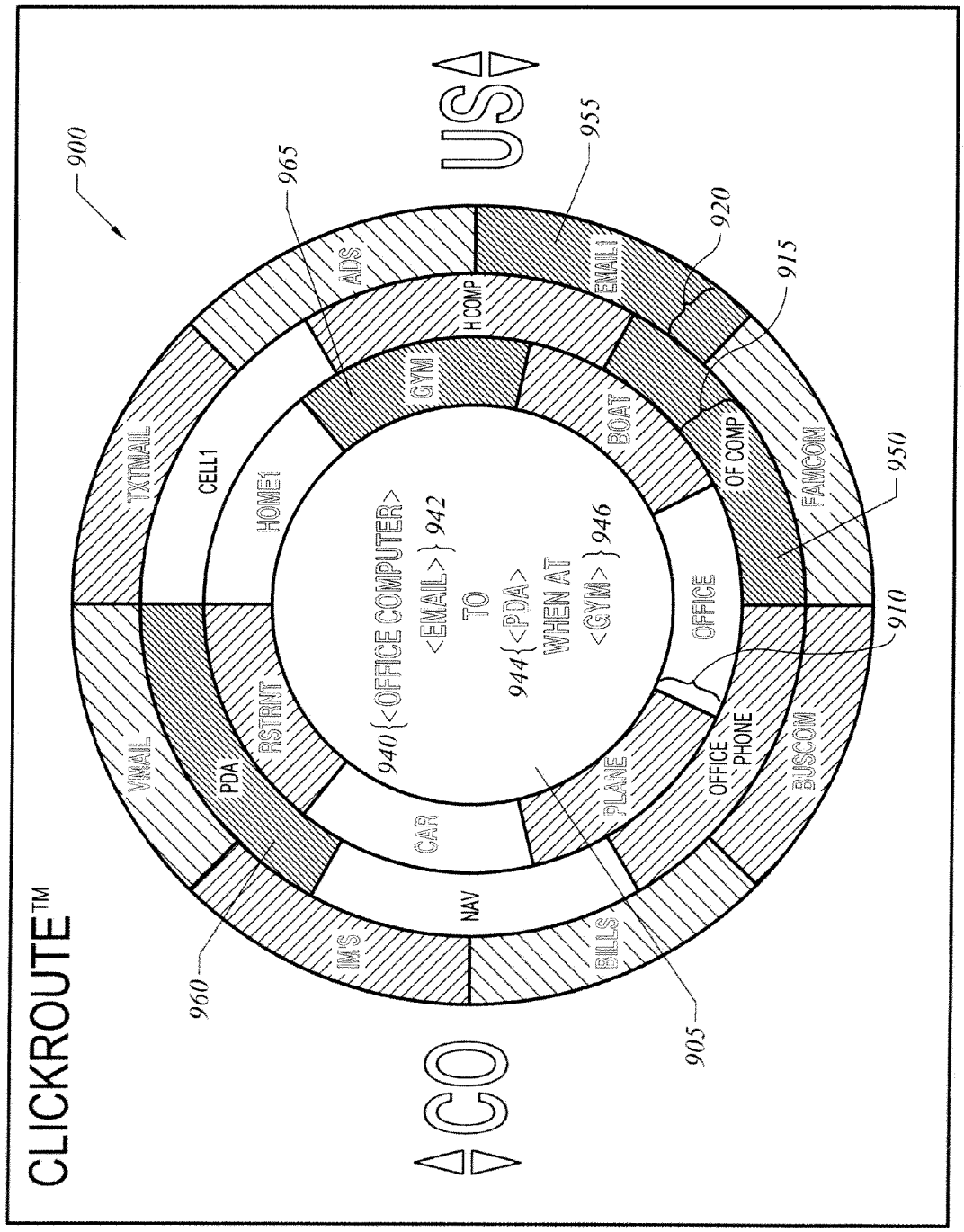
FIG. 9 is an illustration of a GUI for routing a class of communications between devices and locations.

FIG. 9 depicts a GUI 900 for facilitating a user to schedule routing or rerouting of information, communication, or data from a first source to a second source. The GUI 900 comprises a center display portion 905, an inner concentric circle 910, a middle concentric circle 915, and an outer concentric circle 920. The center display portion 905 can be implemented to display a type of communication, information, or data 942 to be routed or rerouted; the originating source 940 of the communication, information, or data 942; the destination source 944 for receiving the routed or rerouted information, communication or data 942; and the location of the destination source 946. The outer concentric ring 920 can include at least eight user selectable data-intervals representing the following information, communication, or data: textmails (TXT-MAIL), advertisements (ADS), emails (EMAIL1), family communications (FAMCOM), business communications (BUSCOM), bills (BILLS), instant messages (IM'S), and voicemails (VMAIL).

The middle concentric ring 915 can include at least six source-intervals representing the following originating or destination sources: a cell-phone (CELL1), a home computer (HCOMP), an office computer (OF COMP), an office phone (OFFICE PHONE), a navigation system (NAV), and personal digital assistant (PDA). The inner concentric ring 910 can include at least seven destination-intervals representing the following: home (HOME1), gym (GYM); boat (BOAT), office (OFFICE), plane (PLANE), car (CAR), and restaurant (RSTRNT).

A user can select an originating source by selecting from the six user selectable source-intervals on the middle concentric ring 915. For example, FIG. 9 depicts a user selection of an office computer (OF COMP) 950. The user can also select the type of information, data, or communication to be routed or rerouted from the selected originating source by selecting one of the eight data-intervals from the outer concentric ring 920. In the example depicted in FIG. 9, the user selects email (EMAIL1) 955 for routing or rerouting. The user can also select the destination source by selecting one of the six source-intervals from the middle concentric ring 915. In FIG. 9, a user selection of a PDA 960 as the device ring 915 is depicted. Further, the user can select the location of the device ring 915 by selecting one of the seven destinations from the inner concentric ring 910. FIG. 9 depicts a user selection of the gym (GYM) 965 as the location ring 910. The result of the user selection depicted in FIG. 9 is to schedule a routing or rerouting of the user's email 955 from the office computer 950 to the PDA 960 when the user is at the gym 965.

Figure 10:
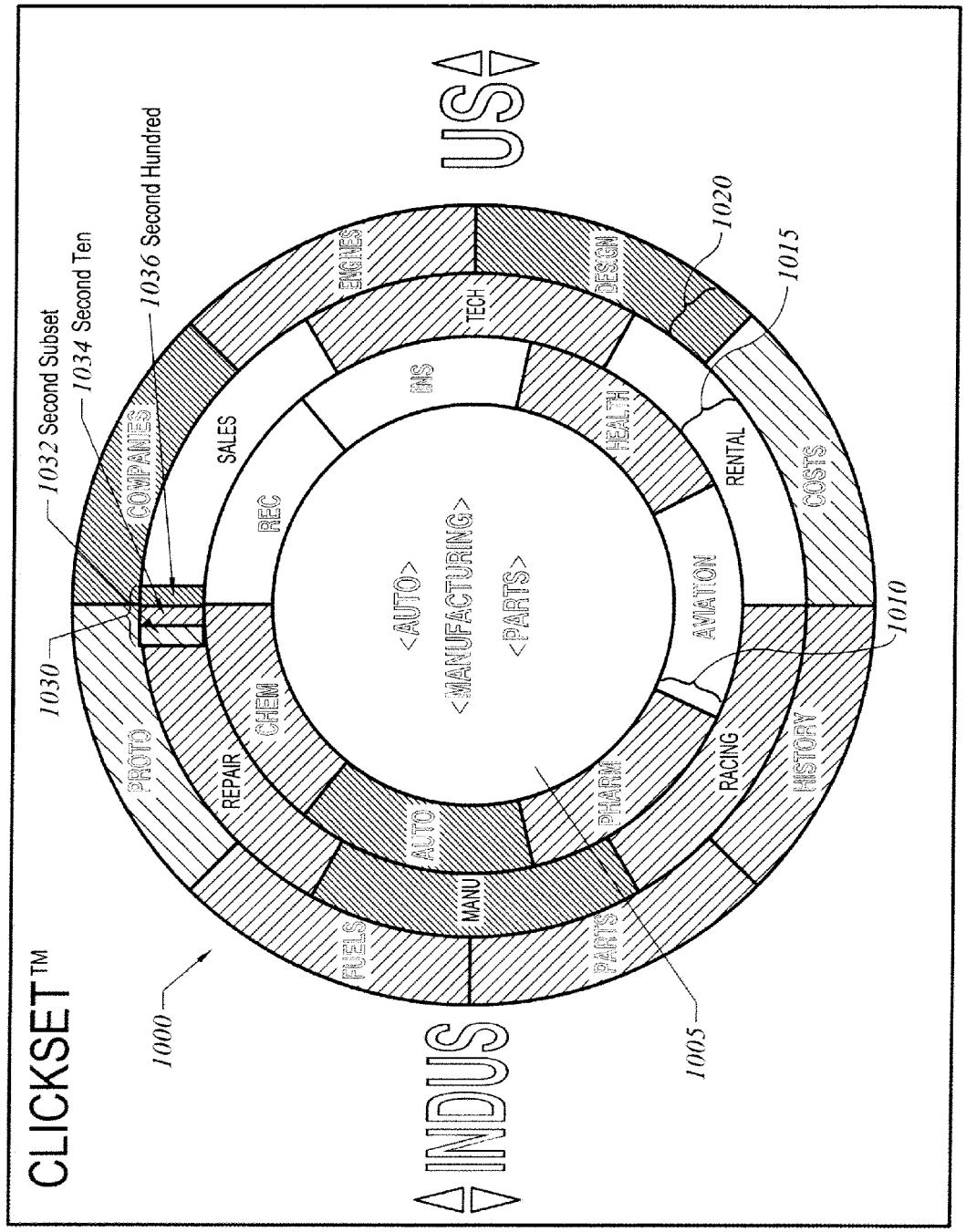
FIG. 10 is an illustration of a GUI for selecting one or more hierarchically arranged documents.

FIG. 10 depicts a GUI 1000 for searching, selecting and/or displaying data files such as documents arranged in a hierarchical arrangement. The GUI 1000 comprises three bounded circumferential regions or concentric rings 1010, 1015, and 1020 surrounding a center display portion 1005. Each of the bounded regions or concentric rings 1010, 1015, and 1020 and the center display portion 1005 can contain multiple GUI elements associated with categories of documents. Starting from the root or base concentric ring 1010 (e.g., the inner most concentric ring in FIG. 10), a user selection of a GUI element on one concentric ring can result in a dynamic modification of the GUI elements displayed in the next immediate concentric ring representing the next level in the hierarchy (e.g., the next immediate outer concentric ring). While FIG. 10 depicts three layers of concentric rings 1010, 1015, and 1020, the number of concentric rings can vary depending on the layers of hierarchy representing the documents or data. In addition, in some implementations, the outer most concentric ring can be implemented as the root or base concentric ring.

The first concentric ring 1010 can include GUI elements representing the root categories of documents. For example, FIG. 10 shows at least seven GUI elements representing the following root categories of documents: recreation (REC), insurance (INS), health (HEALTH), aviation (AVIATION), pharmaceutical (PHARM), automotive (AUTO), and chemical (CHEM). The second concentric ring 1015 can include GUI elements representing the first level of subcategories under the root categories. FIG. 10 shows at least six GUI elements representing the following subcategories related to a user selection of AUTO: sales (SALES), technology (TECH), rental (RENTAL), racing (RACING), manufacturing (MANU), and repair (REPAIR). The third concentric ring 1020 can include GUI elements representing the second level of subcategories, which falls under the first level of subcategories. FIG. 10 shows at least eight GUI elements representing the following subcategories generated by a user selection of manufacturing: companies (COMPANIES), engines (ENGINES), design (DESIGN), costs (COSTS), history (HISTORY), parts (PARTS) fuels (FUELS), and prototype (PROTO).

To select and display a desired data file, such as a document, a user can select one of the GUI elements from the first concentric ring 1010 to signify an input selection from the root categories. For example, FIG. 10 depicts a user selection of the GUI element "AUTO" representing the root category automobile, which is displayed on the center display portion 1005. The user selection can result in a retrieval of a list of documents (or a portion of the responsive documents, content schema, etc.) containing a restriction identifier associated with the selected GUI element. For example, all relevant documents related to "AUTO" can be retrieved from an appropriate source.

Alternatively, the user selection can result in modifications to the GUI elements in the concentric rings 1010, 1015, and 1020. For example, the user selection of the GUI element "AUTO" can either retrieve all documents related to AUTO or modify the next outer level concentric ring 1015 to display GUI elements representing the next highest level of subcategories under the root category, "AUTO."

Modifications to the GUI elements in the concentric rings 1010, 1015, and 1020 can be implemented using various processes. For example, each of the GUI elements can be populated with appropriate subcategory name/title and a user selectable link to a data file corresponding to the subcategory name/title. This populating maps each GUI element to a corresponding target data file, data category, search criteria, etc.

After the user selection of the GUI element "AUTO," the user can further select one of the GUI elements on the second concentric ring 1015 to further restrict the categories of documents. For example, a user selection of the GUI element "MAN U" can result in a retrieval of documents relating to automobile manufacturing. In addition, the third concentric ring 1020 can be modified to display relevant subcategories that fall under automobile manufacturing. The user can further select one of the GUI elements on the third concentric ring 1020 to further restrict the categories of documents. For example, a user selection of the GUI element labeled "FUELS" can result in retrieving information pertaining to documents relating to the attribute "FUELS" and/or can cause further GUI elements to be modified and displayed with further restrictions to the attribute "FUELS" being displayed in connection with various GUI elements (e.g., diesel fuels, ethanol fuels, etc.). In such implementation, a fourth concentric ring (not shown) can be displayed as the next outermost concentric ring representing the next level of subcategories.

FIG. 10 also shows GUI 1000 including user selectable subset selectors 1030 for easily modifying the GUI elements presented on the corresponding concentric ring. On any GUI element representing a subcategory section on any concentric rings 1010, 1015, and 1020, a set of multiple narrow bands can be implemented as the subset selectors 1030. The subset selectors 1030 can facilitate a user selection of a desired subset of subcategories for the corresponding concentric ring. For example, a user selection of a first subset selector 1032 can be used to replace the existing subset labels with an alternate set of second subset labels.

Alternatively, the user selection of the first subset selector 1032 can allow the user to continuously cycle through the available subsets of subcategories one-by-one to select the desired subset. For example, a second subset selector 1034 can be selected to cycle through the available subsets in increments of ten successive subsets. A third subset selector can be selected to cycle through the subsets in one hundred increments. By selecting the appropriate subset selector, a user can select, for example, alternate subset three-hundred representing the three-hundred$^{th}$ available subset.

In some implementations, the order of the available subsets can be reorganized through a feedback mechanism based on various user interactions. For example, the subsets can be ordered based on the number of users selecting the subsets (frequency of use). Alternatively, the subsets can be ordered by other expert means. For example, the most frequently used by one or more experts, celebrities, or other suitable persons. Further, the subsets can be ordered by a reference to a locale, time, time period, or other suitable conditions in the external world, such as the price of oil.

In some implementations, the varying number of concentric rings representing a hierarchy or levels of data, as shown in FIG. 10, can be applied to facilitate a user navigation of websites. In one pass, a user can select a GUI element representing a desired website from the first concentric ring 1010. Based on the user selection from the first concentric ring 1010, the second concentric ring 1015 can be modified to display multiple GUI elements representing a first level of navigation choices that fall under the selected website. The GUI elements displayed on the concentric rings (e.g., first concentric ring, second concentric ring, etc.) are visually differentiated by use of labels, graphic or a combination of both. A visual or graphic label for each GUI element can be dynamically changed based on the user selection.

A user selection from the second concentric ring 1015 can result in a modification of the third concentric ring 1020 to represent a third set of choices. The number of concentric rings provided can be varied based on the number of levels of user selectable elements available other criteria, or a combination of both. In some implementations, if a user selection results in redirecting the user to a page on another website, the corresponding concentric ring can be modified to be displayed in a special manner, such as a special highlight. The special display indicator serves as an indication that an external link is available.

In these implementations, a user can review and evaluate the layout of a website or other collection of documents prior to navigating them. The documents and/or categories can be displayed in a hierarchical fashion associated with the structure of the documents (i.e., how the documents are linked and/or stored). A user can select additional restrictions to more specifically target a subset of responsive documents without wading through numerous web pages first. The bounded regions or concentric rings need not match the navigation topology of a particular website, so that a designer of a navigation tool may develop sets and subsets more appropriate to the particular website.

In implementations for navigating websites and documents, the GUI elements representing navigation sets (e.g., information populated, or mapped to, in the bounded regions or concentric rings) can be preloaded, allowing rapid navigation without loading the web pages. Furthermore, in response to a query of a search engine, the navigation tools associated with each identified website can be pulled up, allowing the user to pre-navigate websites without loading the pages to navigate and thus make locating information faster and more accurate. Also, a GUI tool designer may create a navigation GUI by categories prior to, or intermixed with website navigation.

A designer may selectively included or exclude website material. A designer also may make available selections of a finer granularity, e.g., a paragraph rather than a page, or a photo rather than a page. A designer may make the website address invisible, so the website may not be located separately other than the specified content of the website appearing in a window on the original navigation location. Furthermore, a designer may include sponsored locations with non-sponsored locations on the same bounded region or concentric rings.

A tool containing one or more of the GUIs 100, 400, 500, 600, 700, 800, 900, and 1000 can include, once loaded, all navigation and categorization schemes necessary to illustrate the subsets of all the available selections at the top level without the need to obtain data from another source. In some implementations, the tool may utilize an outside source located at a central server or servers on the Internet or wide area network ("WAN") to identify subsets of selection choices to present navigation choices. Additionally, one or more of the GUI elements may be associated with a sponsored link and such GUI element may be displayed in a visual format differing from other GUI elements.

While FIGS. 1 and 4-10 depict GUI elements for various GUIs 100, 400, 500, 600, 700, 800, 900 and 1000 displayed in a contiguous ring shape, the GUI elements can be displayed in any suitable contiguous geometric shapes on any digital display device where those shapes show navigation maps of websites or content schema. In some implementations, the shapes implemented can contain user selectable GUI elements representing sets and subsets of categories or levels. Additionally, the selection of a member of a set or a subset can call up a new contiguous geometric shape containing members of a subset of that original selection. Such calling of a subset may comprise polling an external node upon which the navigation GUI resides.

Selection of a GUI element and/or entry of a search query can result in a modified GUI element which can include descriptive text of a website or information location (e.g., a URL). The modified GUI can include descriptions associated with a subset of documents associated with a selected GUI element. Optionally, the selection of a GUI element can result in the display of at least a portion of a web page associated with such GUI element.

An index of document categories can reside locally or in an external data source. Additionally, rules for structuring/arranging the bounded regions or concentric rings can reside locally or in an external data source. The index and/or rules may describe the hierarchy of the arranged documents and/or describe priorities for displaying the documents (and or set/subset categories) in a GUI.

It will be appreciated that various geometric shapes may be used in connection with the subject matter described herein. The geometric shapes may be bounded and/or continuous. In some implementations, the various regions may be non-contiguous and/or otherwise spatially positioned. In addition, it will be appreciated that a wide variety of information may be presented when a GUI element is selected, such as accompanying digital content, including an image, sound, and/or text.

In some implementations, a web crawler or similar mechanism may be used to automatically review a large set of documents, pages, page sets, and page subsets, in order to build an index characterizing a topology of such documents. This index and topology may be used to populate or map to selectable labels/links associated with GUI elements and the physical layout of such elements. If a web address or other document location indicator is identified, the GUI elements may be repopulated by or mapped to data files based on the location of such web address (i.e., the hierarchical arrangement of the documents can be changed as the entered web address will act as the root node). For each document in the index, additional topology information may be provided which describes interrelated documents both within a single website and external thereto. Optionally, the index may also identify potential attributes within each document which can be used as the labels for GUI elements within an interface such as that illustrated in FIG. 10.

The number of levels of a document hierarchy may be expanded or reduced based on user input. Special graphical elements may be provided to indicate that a hierarchy may be expanded or compressed. The granularity of such a hierarchy may be varied by a user so that only a predetermined number of categories and/or levels are displayed at any time.

A web crawler or other software agent may poll websites (or other logical collections of documents) to offer an ability to embed or map a GUI as described herein. The interface may be provided as a shell without any hierarchical information (but optionally with some additional features) or, in other variations, the interface may be pre-populated with or mapped to different categories characterizing the relevant documents. If a shell is provided, an administrator of the website may associate the documents in the website with various categories so that the interface may be populated by or mapped to appropriate data files.

In some implementations, a GUI 1000 such as that described in connection with FIG. 10 can include documents from multiple websites and/or multiple pages residing on a website which does not contain the underlying documents. The GUI 1000 can, upon installation, embed or map a locator for the underlying documents in either the URL line or in any schema of keywords or topological identification in order to more readily be found by any search. Optionally, a remote index (e.g., an index populated by or mapped to a web crawler) may be used to periodically update and populate or map the GUI elements. Moreover, by embedding the interfaces on a series of websites, the categories populated or mapped in such websites may be searched or otherwise traversed (rather than key word searching of all of the contents of a document)

The web crawler when searching websites, topologies, or schemas, may identify and catalog GUI objects or elements and their locations. In addition, topologies of the GUI elements can be cataloged as presented and made available. Additionally, the web crawler mechanism, upon navigating to an intended target URL or topology, may duplicate the embedded GUI object or its labels and topology (e.g., a tree structure) and retrieve the GUI object as an index, topology, or tree, so that the GUI object might be similarly represented on another website in that GUI object or a similar GUI object by storing it on that website. If there is not an embedded GUI object on the target website or topology, the web crawler mechanism may duplicate the website topology (tree structure) and retrieve the website topology as an index, topology, or tree, so that the website topology can be similarly represented on another website in that GUI object or a similar GUI object by storing the website topology on that website.

In some implementations, the GUI elements may be populated or mapped as a user moves through a website. In addition or in the alternative, a user (e.g., a webmaster) may download a GUI object, set the options and install the GUI object, which would then be loaded with navigation labels from a transient visit (navigations, or web crawler) from the company as a trusted source.

The GUIs 100, 400, 500, 600, 700, 800, 900, and 1000 can alternately be populated or mapped with documents based on past usage statistics for a particular user and/or a class of users. For example, the navigation schema of the website or topology delivering the highest number of visits for the past two (y) hours may be displayed for one (x) hour(s). The usage statistics may be based on most frequently used, most recently used, length of duration of visits to certain pages, amount of time required to retrieve a document and the like. Alternately, the documents populated or mapped within the GUI may be selected based on a geographic position of a user (which may be determined, for example, based on an IP address associated with the user). Additionally, certain documents may be given prioritized placement within the hierarchy of the GUI based on a wide variety of criteria, including but not limited to, whether an advertiser has paid for the placement of the document.

In some implementations, a first GUI element may be populated by web crawling or analyzing by means of a statistical or expert rule basis, where two or more other GUI elements are analyzed to determine what labels will populate the first GUI element. Alternatively, a statistical or expert rule basis can be applied to two or more other GUI elements residing or related to the subsets of a particular duration of time or particular locale of space to determine what labels will populate the first GUI element. Moreover, a single GUI element may be identified with one or more individuals or one or more companies, with said individuals or companies named at the center of the GUI object with an alphanumeric string, such as a name, email address, or private identifier. In this case, the labels would be associated with the personal topology of that individual or the company topology of that company.

In some implementations, the label for each of the GUI elements may be populated by or mapped to a specific statistical parameter. For example, an order or ranking can be determined for all available data files (corresponding to available labels) based on a number of times selected by users of all and any labeled GUI elements. From the order/ranking determined, the most selected data file can be used to populated the labels of the GUI elements. Alternatively, the order or rankings can be determined based on a number of times selected by users of any and all labeled GUI elements when that labeled space is one of a subset of a given set (e.g., "Macintosh" as the most selected when the set is "apples").

In some implementations, labels for the GUI elements may be populated by or mapped based on a specific expert rule. For example, if the temperature drops below 40 degrees Fahrenheit, then populate the label space of all GUI objects with the set of "vacation" with at least one label, "cruises." Or populate by examining all GUI objects with the words "vacation" and "warm."

In some implementations, the labels of GUI elements may be populated or mapped via a reference to a specific duration of time. For example, a duration time can indicate that the GUI element is to be populated by a source or given parameter for a period of one specific hour on a specific time and date. Alternatively, the labels can be populated by or mapped to the most selected labels that occur for a period of time (e.g. for a period of two hours) after a particular event. In another alternative, the population of GUI elements can be continually updated by examining the GUI element populations within a certain duration or time period, or to be continually updated during or at specific times.

In some implementations, the labels of GUI elements may be populated by or mapped to a reference to a specific locale of space. Specifically, this may indicate that the GUI element is to be populated by or mapped based on an examination of the population of a source or given parameter in the locale of a specific spatially defined region, abstract area or geographical location. Alternatively, this may indicate that the GUI element can be populated by or mapped based on the most selected labels that occur in a particular radius of a given event or in a certain locale. In another alternative, this may indicate that the population of GUI objects can be continually updated by examining the GUI object populations within a certain radius or in a specific locale, or that the GUI object population can be updated within a certain radius or locale.

In some implementations, the labels for the GUI elements can be populated by a measure of value created. Starting from the root labels and traversing down the levels of hierarchical sets and subsets of labels, each path along the hierarchy can be analyzed based on the value generated through user payments. The path that generated the most value can be used to populate the labels to indicate the most valuable hierarchy of information pathway.

In some implementations, the labels for the GUI elements can be populated based on a chronology of the available labels. For example, the chronology can be determined based on a historical order in which labels have been entered or created.

In some implementations, the labels for the GUI elements can be populated using a random generator. The labels can be randomly selected from an available pool of labels (and the corresponding data files).

Further, the labels for the GUI elements can be populated an advertisement or company logo or slogan (e.g., within or adjacent to a graphical user interface and/or element). In addition, the GUI may be used to provide coupons or other offers to users.

In some variations, the GUIs as described with respect to FIGS. 1-10 above may be configured to conduct one or more of the following operations: receive an e-mail address, telephone number, credit card number, and the like; display a superset of visual objects that includes an existing displayed set; increase or decrease boundaries of a physical space in the external world that is the object of the display; or rotate through the set of visual objects by highlighting or emphasizing each individual member of the set in turn.

Figure 11A:
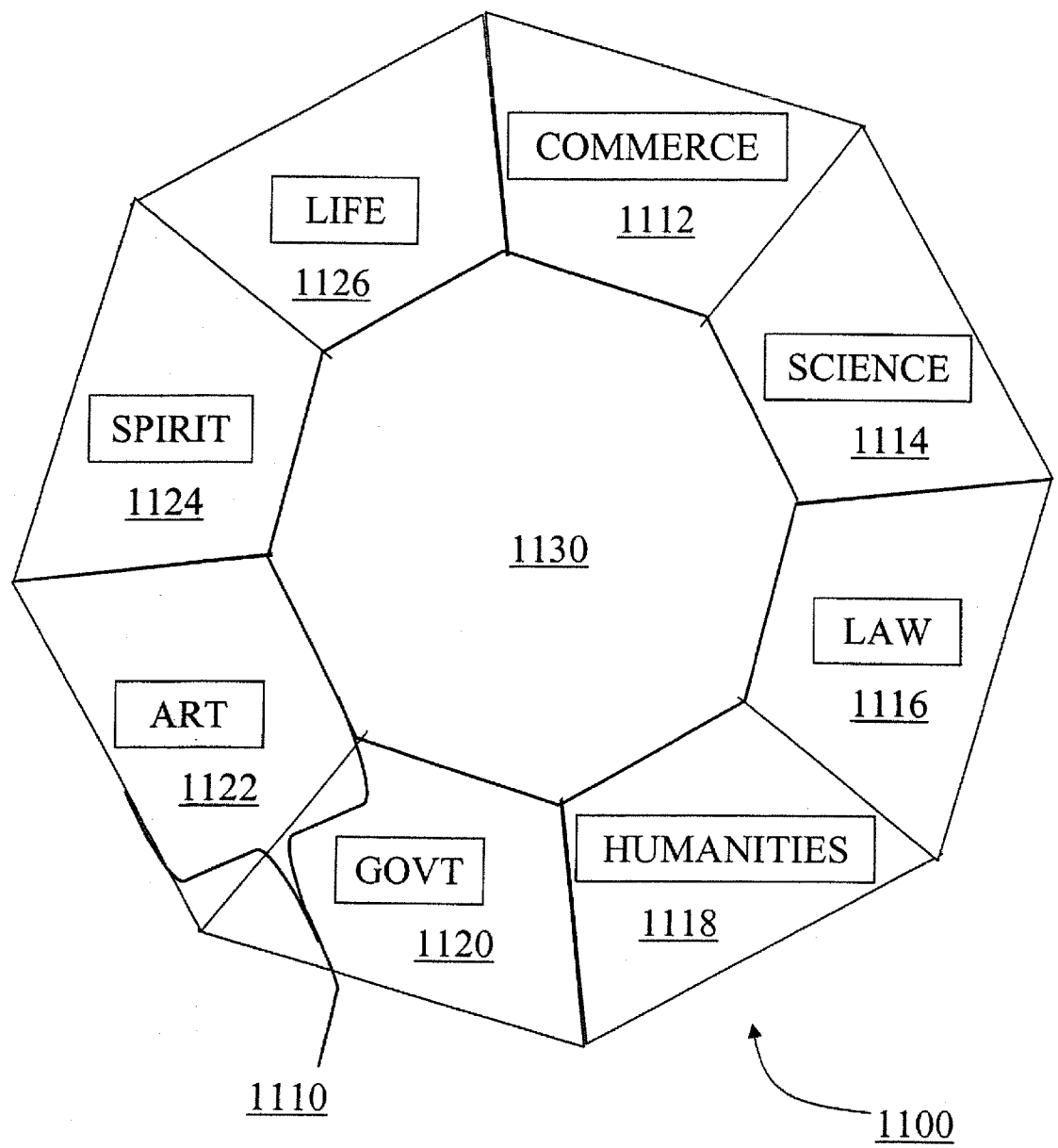
FIGS. 11A-D are illustration of a GUI displayed as a cascade of concentric rings.

Further, a user selection on a GUI as described with respect to FIGS. 1-10 above can be displayed using alternative display options. For example, FIGS. 11A-F depicts a "cascading" display implementation to provide the previewing functionality to a GUI. The GUIs as described in FIGS. 1-10 above can be implemented to include a cascade of concentric rings as shown in FIG. 11A-F. The GUI 1100 includes a first concentric ring 1110 circumferentially surrounding a center display 1130. The first concentric ring 1110 includes multiple GUI elements 1112, 1114, 1116, 1118, 1120, 1122, 1124, and 1126 (e.g., COMMERCE, SCIENCE, LAW, HUMANITIES, GOVT, ART, SPIRIT, and LIFE). While FIG. 11A illustrates eight GUI elements, the number of GUI elements included in the first concentric ring 1110 can vary. For example an automated algorithm can be implemented to dynamically change the number of GUI elements included in the first concentric ring 1110. Alternatively, a user may manually designate the number of GUI elements to include in the first concentric ring 1110.

Figure 11B:
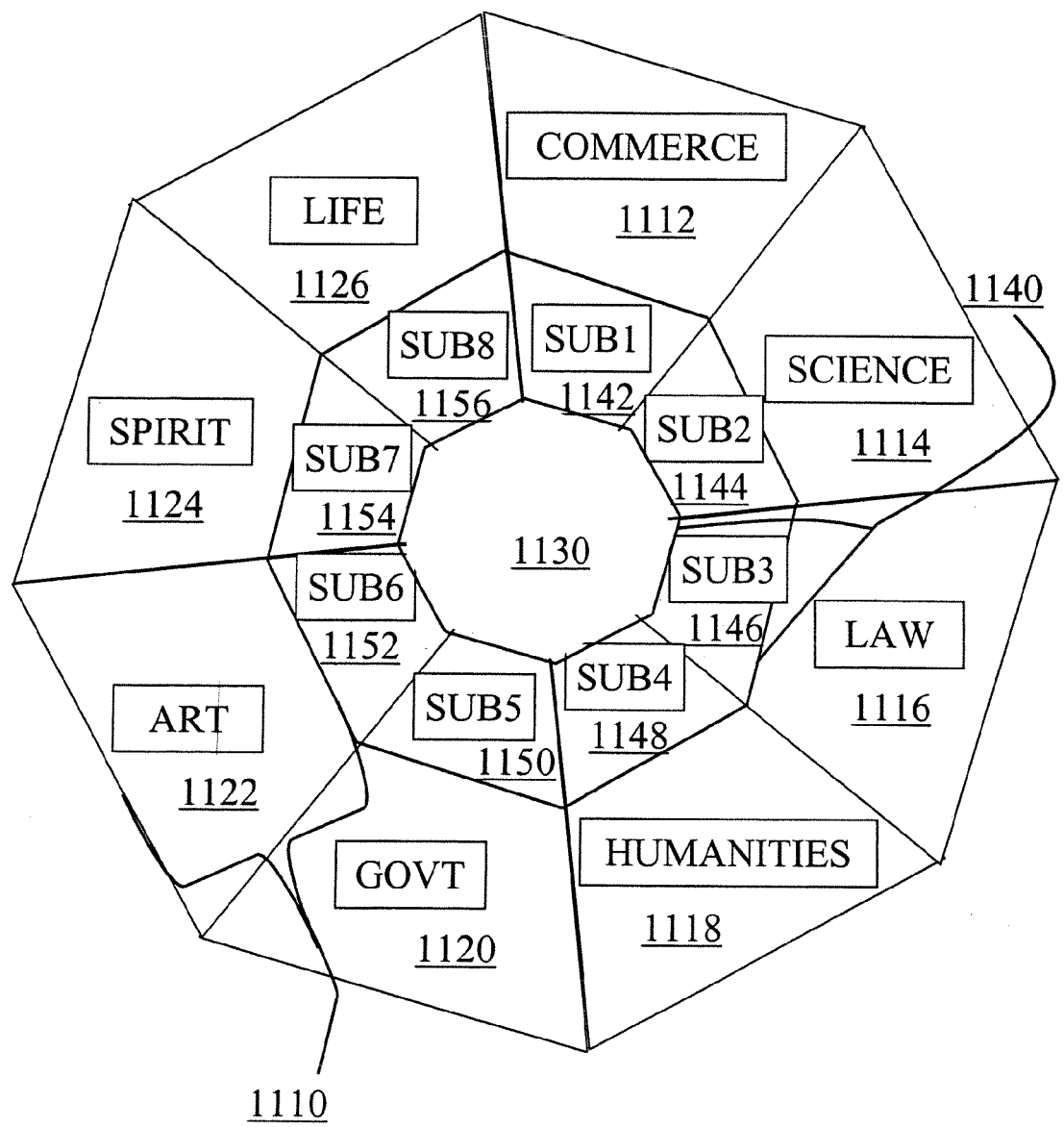

In use, a use can pre-select one of the GUI elements 1112, 1114, 1116, 1118, 1120, 1122, 1124, and 1126 to display a preview of the next available GUI elements 1142, 1144, 1146, 1148, 1150, 1152, 1154, and 1156 related to the pre-selected GUI element, as shown in FIG. 11B. The previewed GUI elements 1142, 1144, 1146, 1148, 1150, 1152, 1154, and 1156 can be a list of headings or labels that represent subcategories (SUB 1-8) of the pre-selected GUI element. The previewed next available GUI elements 1142, 1144, 1146, 1148, 1150, 1152, 1154, and 1156 are displayed on a second concentric ring 1140. Pre-selecting one of the GUI elements 1142, 1144, 1146, 1148, 1150, 1152, 1154, and 1156 can be effectuated by placing a mouse cursor over the desired GUI element. Alternatively, other suitable user inputs can be utilized to indicate a pre-selection. For example, a left mouse click can be used to pre-select a desired GUI element.

A visual indicator can be implemented to indicate a GUI element as the pre-selected GUI element. For example, a pre-selection of the GUI element "COMMERCE" 1112 can be visually indicated by bolding the text of the label, "COMMERCE" or changing the color of the text. Alternatively, other suitable visual indicator can be implemented.

Previewing the second concentric ring 1140, which includes a preview of the next available subcategories of GUI elements 1142, 1144, 1146, 1148, 1150, 1152, 1154, and 1156, allows the user to determine if the previewed second concentric ring 1140 includes the desired subcategories. This prevents the user from blindly selecting GUI elements and thus wasting valuable time and processing power. Thus, a user need not navigate through a series of web pages unnecessarily, and the user is able to navigate only the relevant web pages.

After previewing the second concentric ring 1140, the user can determine whether the previewed second concentric ring 1140 includes the desired subcategories of GUI elements. If so determined, the user can select the pre-selected GUI element by using a standard user input. For example, a left mouse click can effectuate the user selection of the pre-selected GUI element. A visual indicator, different from the one used for pre-selection, can be implemented to a visual indication of the user selection of the GUI element. For example, the text label of the GUI element can be highlighted. Alternatively, other suitable visual indicators, such as embossing, shadowing, animation, and 3D effects can be implemented.

Figure 11C:
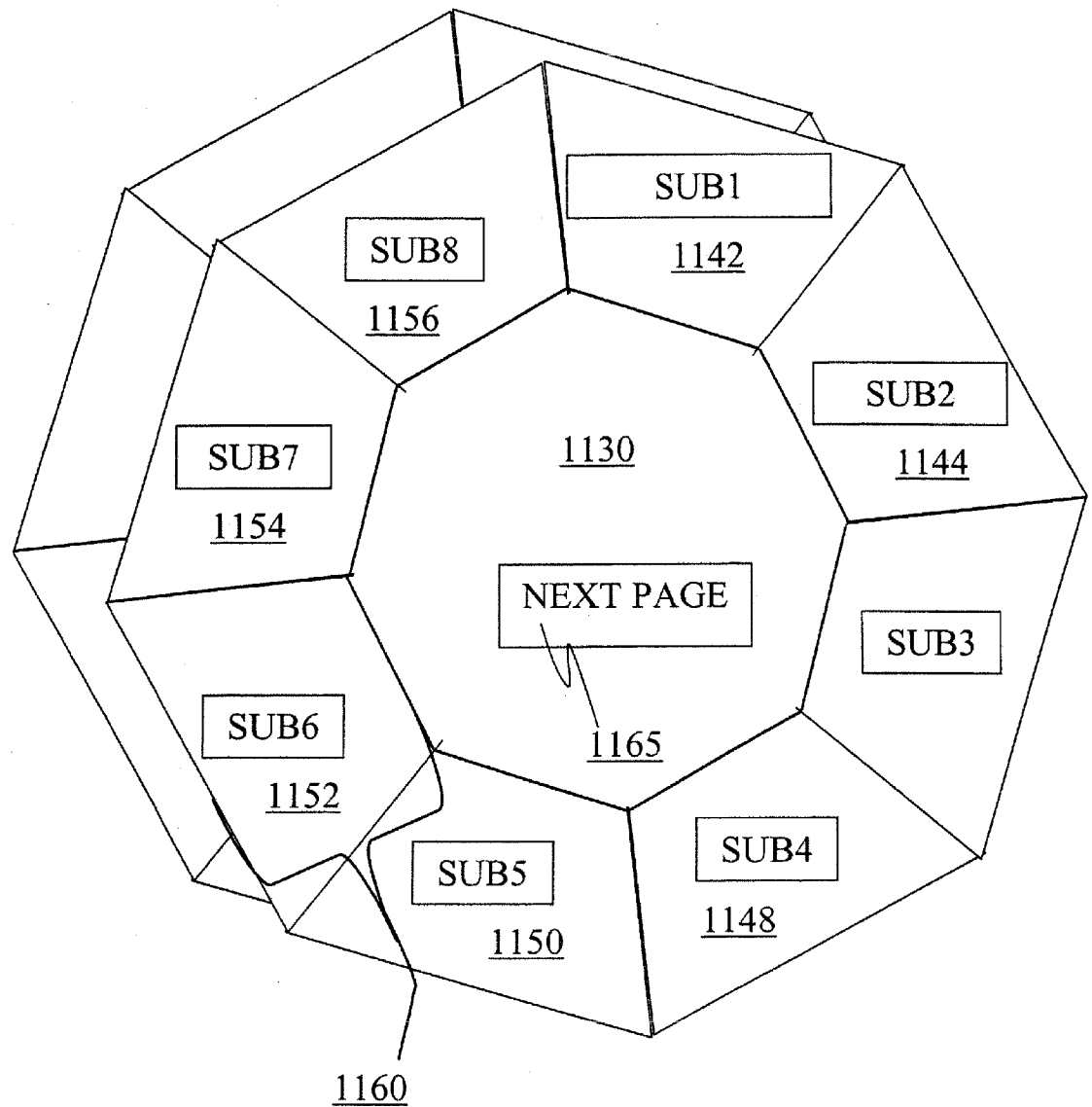

In response to the user selection of the pre-selected GUI element, a cascade of concentric rings are generated and displayed as shown in FIG. 11C. In the cascaded concentric rings, a new first concentric ring 1160 is implemented to display the previewed subcategories of GUI elements 1142, 1144, 1146, 1148, 1150, 1152, 1154, and 1156 corresponding to the selected GUI element.

In some implementations, the subcategories of GUI elements may be greater in number than the available spaces on the new first concentric ring 1110. A "NEXT PAGE" selector 1165 can be implemented (e.g., using a button) to allow the user to select the remaining subcategories of GUI elements.

Figure 11D:
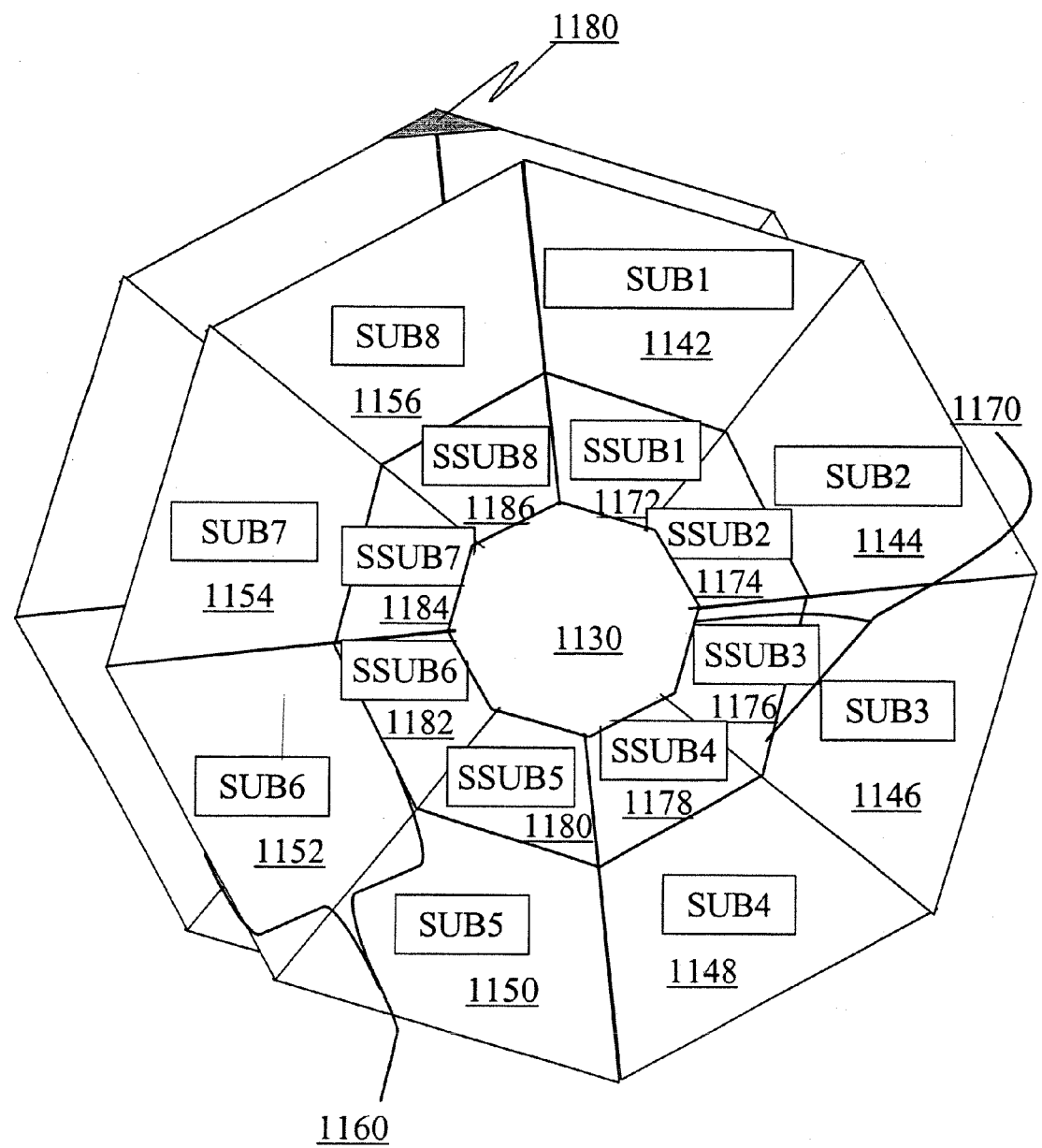

The process to pre-select a GUI element to preview the next subcategories of GUI elements before selecting the GUI element can be implemented again with respect to the new first concentric ring 1110. In this instance, a list of subcategories corresponding to a pre-selected one of the subcategories of GUI elements 1142, 1144, 1146, 1148, 1150, 1152, 1154, and 1156 can be displayed in a new second concentric ring 1170 as shown in FIG. 11D. As described with respect to FIGS. 11A-B above, the user is able to preview the next available subcategories of GUI elements before actually navigating through the GUI elements.

With each subsequent selection of a GUI element, a new layer of concentric ring can be cascaded over the previous concentric ring. Therefore, a user can "drill down" or navigate through a hierarchy of categories and subcategories by cascading (or layering) a new layer of concentric ring, each time displaying the most recent layer of GUI elements on top.

To allow the user to access the previously selected categories displayed on the previous first concentric ring, a previous ring selector 1180 can be implemented. The previous ring selector 1180 can be positioned on a easily visible portion of the previous first concentric ring to allow easy user selection. In response to the user selecting the previous ring selector 1180, the cascade of concentric ring reverts back one layer as previously shown in FIG. 11A.

The process of pre-navigating (or previewing) as described with respect to FIGS. 10 and 11A-D above can be implemented to populate the labels of the GUI elements in the concentric rings using various techniques. For example, the labels can be populated manually by the user by selecting from a database or list of available data files. Each of the labels represent a user selectable link (e.g., hyperlink) to the corresponding data file. Alternatively, the labels can be populated automatically in a dynamic fashion based on each user selection. For example, a web crawler (e.g., a search engine) can be used to dynamically populate the labels to facilitate the user in navigating the currently selected website or an external third party website. One or more of the GUIs (e.g., 1000, 1100) can be incorporated with a website to provide a tool for pre-navigating through one or more websites. As described above, such pre-navigating allows the user to jump to a select website only after previewing the contents of the website to confirm the presence of a desire content.

Figure 12:
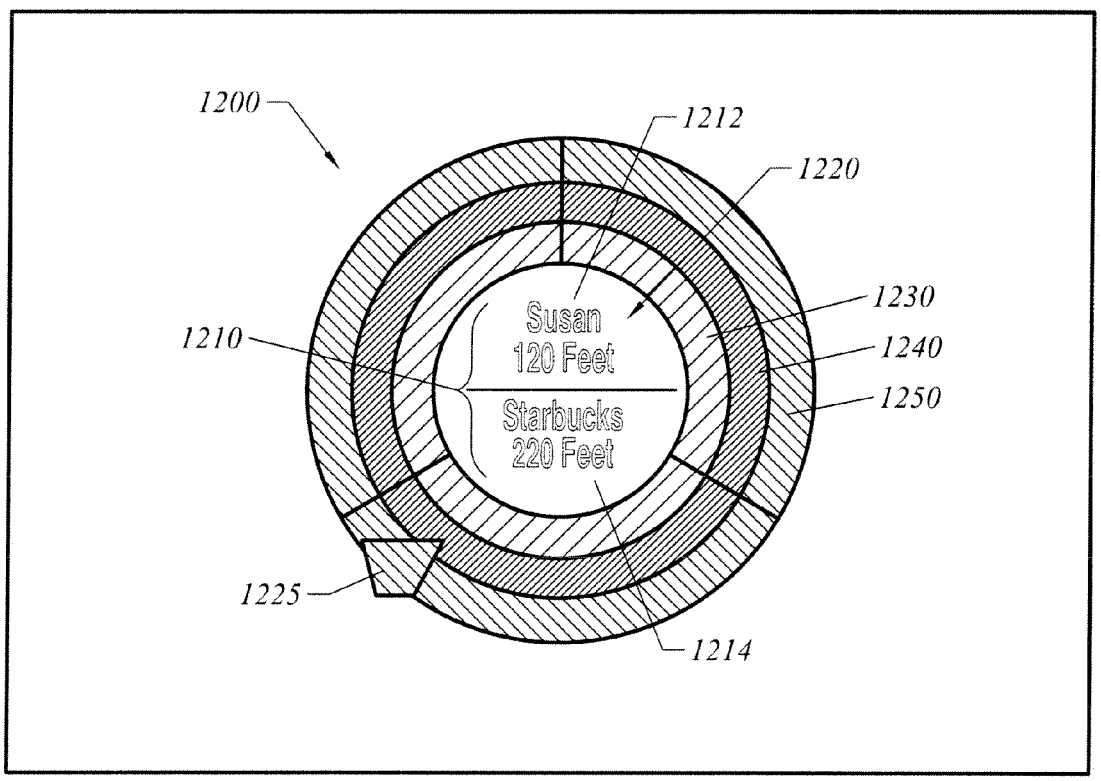
FIG. 12 is an illustration of a GUI for identifying the location and distance of an individual and/or a location.

In some implementations, techniques can be implemented to provide a visual indication of positioning information collected from position data source, such as a GPS system. FIG. 12 shows a GUI 1200 for displaying a location of a desired person, place, objects, etc. The GUI 1200 can include a center display portion 1210, a first target indicator 1220, a second target indicator 1230, a first concentric ring 1230, a second concentric ring 1240, and a third concentric ring 1250. The center display portion can include multiple sub-display areas 1212, 1214 for displaying the locations of each target person, place, object, etc. The first target indicator 1220 is a visual representation of the first target person, place, objects, etc. The second target indicator is a visual representation of the second target person, place, object, etc. While FIG. 12 shows only two target indicators, the total number of target indicators are not limited to a set number.

The first 1230, second 1240, and third 1250 concentric rings can be implemented to represent different geographic location, distance, place, or other suitable geographic intervals. For example, the first concentric ring 1230 can represent the first floor of a building; the second concentric ring 1240 can represent the second floor; and the third concentric ring 1250 can represent the third floor.

FIG. 12 shows the first target person, "SUSAN," located 120 feet away as indicated in the first target display area 1212. In addition, the second target location, "STARBUCKS," located 220 feet away as indicated in the second target display area 1214. The first target indicator 1220, representing "SUSAN" is shown to reside in the first concentric ring 1230. In such implementation, the first target indicator 1220 indicates that "SUSAN" is located on the first floor of a building 120 feet away. While FIG. 12 shows three concentric rings 1230, 1240, and 1250, the total number of concentric rings can vary based on a predetermined display format or dynamically as the display information changes dynamically. In addition, the geographic information used to implement the GUI 1200 can be obtained via a global positioning system (GPS) interface or other suitable positioning systems.

The user input into the GUIs 100, 400, 500, 600, 700, 800, 900, 1000, 1100, and 1200 may be professed to perform at least one of the following actions: create register values appended to logical software containers; create register values appended to logical software containers that can communicate with other logical software containers; create register values appended to logical software containers that can interact with other logical software containers; or create register values appended to logical software containers that can communicate and interact with other logical software containers. Furthermore, the user input into the GUI may be for displaying a corresponding result in a display window; causing the registers of a logical container to be formed with a value or altered in value; or causing a computer chip related device to modify incoming communications to that device.

Also, the user input into the GUI may be for causing a computer chip related device to modify the delivery time or delivery place of incoming communications to that device; causing a computer chip related device to modify the delivery time or delivery place of outgoing communications from that device; causing a corresponding result in any routing systems that causes at least one class of communications to be routed from one device with a display to another device with a display; or causing a concentric labeled ring to rotate in relation to a fixed point that once stopped upon indicates a selection.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a WAN, and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible and within the scope of the following claims. For example, each of the GUI elements described herein can be implemented to capture information (e.g., an email address) to activate the GUI element. Also, the GUI elements can be implemented to include advertisements inside or on each of the GUI element labels. Further, in some implementations, one or more user inputs as related to FIGS. 1-12 above can be accomplished by holding down a user input element, such as a button or key (e.g., 490, 540, and 595) to rotate a desired ring of intervals 410, 420, 510, 515, 560, and 565. For example, the user selection of a button key A particular user input can be terminated by no further user input, a delay before the next user input, or by a user interfacing with a button, a mouse, a joystick, or a stylus.

What is claimed is:

1. A method comprising:
    providing a graphical user interface, the graphical user interface including
        a display region operable to display a generated result;
        a first bounded region circumferentially surrounding the display region, the first bounded region including one or more first-type graphical user interface elements, wherein the one or more first-type graphical user interface elements are selectively mapped to one or more first-type display data; and
        a second bounded region circumferentially surrounding the first bounded region, the second bounded region including one or more second-type graphical user interface elements, wherein the one or more second-type graphical user interface elements are selectively mapped to one or more second-type display data; and
    receiving a user input through the graphical user interface, wherein the generated result is based at least on the user input corresponding to a user activation of at least one of the first-type and second-type graphical user interface elements;
    wherein providing the graphical user interface comprises
        configuring the first bounded region to include a first concentric ring of one or more first shapes, and the second bounded region comprises a second concentric ring of one or more second shapes; and
        configuring the first bounded region to provide a granularity of categories associated with the first bounded region that is one of greater than or less than the second bounded region.

2. The method of claim 1, wherein providing the graphical user interface further comprises configuring the one or more first-type and second-type graphical user interface elements to selectively map to the first-type display data and the second-type display data so that the first-type display data are related to the second-type display data.

3. The method of claim 2, wherein configuring the one or more first-type and second-type graphical user interface elements further comprises selectively mapping the first-type and second-type graphical user interface elements to the first-type and second-type display data so that the second-type display data include subcategories of the first-type display data.

4. The method of claim 2, wherein configuring the one or more first-type and second-type graphical user interface elements further comprises selectively mapping the first-type and second-type graphical user interface elements to the first-type and second-type display data so that the first-type display data includes subcategories of the second-type display data.

5. The method of claim 1, wherein providing the graphical user interface further comprises providing a plurality of bounded regions, including a third bounded region circumferentially surrounding the second bounded region, the third bounded region including one or more third-type graphical user interface elements.

6. The method of claim 5, wherein providing the plurality of bounded regions further comprises providing a visual label characterizing the selectively mapped first-type and second-type display data with the first-type, second-type, and third-type graphical user interface elements.

7. The method of claim 5, wherein providing the plurality of bounded regions further comprises altering an appearance of each of the first-type, second-type, and third-type graphical user interface elements in response to a user activation of one or more of the first-type, second-type, and third-type graphical user interface elements.

8. The method of claim 5, wherein providing the plurality of bounded regions further comprises selecting the first-type, second-type and third-type graphical user interface elements based on a selected input data selected from a list consisting of a time, a date, a duration, a scale, a location, a scale of space, a span, and subject topologies of websites or databases.

9. The method of claim 1, wherein providing the graphical user interface further comprises configuring the first bounded region to rotate around a central axis in response to an activation of one of the first-type graphical user interface elements in the first bounded region, and configuring the second bounded region to rotate around the central axis in response to an activation of one of the second-type graphical user interface elements in the second bounded region.

10. The method of claim 1, wherein providing the graphical user interface further comprises providing one or more external graphical user interface elements located external to the first and second bounded regions, wherein the generated result is further based on an activation of the one or more external graphical user interface elements.

11. The method of claim 1, further providing a password controlled security system to control user access to the one or more first-type, second type, third-type and external graphical user interface elements.

12. The method of claim 1, wherein providing the graphical user interface further comprises
providing a plurality of user selectable subset selectors operably connected to at least one of the first-type and second-type graphical user interface elements, the subset selectors including a first subset selector and a second subset selector;
wherein the first and second subset selectors are operable to cycle through at least one of the first-type and second-type display data to allow a user selection of at least one desired first-type or second-type display data; and
wherein the user selection of the at least one desired first-type or second-type display data causes at least one of the first-type and second-type graphical user interface elements to display a new label based on the selected first-type or second-type display data.

13. The method of claim 12, wherein providing the plurality of user selectable subset selectors further comprises
configuring the first subset selector to cycle through the first-type and second-type display data in a first predetermined increment, and the second subset selector to cycle through the first-type and second-type display data in a second predetermined increment.

14. The method of claim 13, further comprising
configuring a third subset selector to cycle through the first-type and second-type display data in a third predetermined increment.

15. The method of claim 14, wherein configuring the first, second and third subset selectors further comprises
configuring two or more of the first, second, and third subset selectors to operate in combination to select a desired set of display data.

16. A method comprising:
providing a graphical user interface, the graphical user interface including
a first bounded region including a plurality of first-type user interface elements,
a second bounded region circumferentially surrounding the first bounded region, the second bounded region including a plurality of second-type user interface elements,
a first set of labels displayed on the plurality of first-type user interface elements, and
a second set of labels displayed on the plurality of second-type user interface elements, wherein the first and second sets of labels are related in a hierarchy; and
receiving a user input through the graphical user interface;
wherein providing the graphical user interface comprises
configuring the first bounded region to include a first concentric ring of one or more first shapes, and the second bounded region comprises a second concentric ring of one or more second shapes; and
configuring the first bounded region to provide a granularity of categories associated with the first bounded region that is one of greater than or less than the second bounded region.

17. The method of claim 16, wherein providing the graphical user interface further comprises configuring the first and second bounded regions to include cascaded concentric rings of a geometric shape.

18. The method of claim 16, wherein providing the graphical user interface further comprises
providing a plurality or user selectable subset selectors including a first subset selector and a second subset selector, the first and second subset selectors operable to cycle through a plurality of sets of display data,
wherein a user selection of a set of display data from the plurality of sets of display data causes at least one of the first and second sets of labels to change based on the selected set of display data.

19. The method of claim 18, wherein providing the plurality of subset selectors further comprises
configuring the first subset selector to cycle through the plurality of sets of display data in a first predetermined increment, and
configuring the second subset selector to cycle through the plurality of sets of display data in a second predetermined increment.

20. The method of claim 18, wherein providing the plurality of subset selectors further comprises
configuring the first subset selector the plurality of sets of display data to selectively map to data selected from a pool of available display data based on instructions for assigning a relevance ranking to the pool of display data.

21. The method of claim 20, wherein providing the graphical user interface further comprises
providing a third subset selector to cycle through the plurality of sets of display data in a third predetermined increment.

22. The method of claim 21, wherein providing the graphical user interface further comprises
determining the relevance ranking based on a feedback mechanism to determine a frequency of each of the plurality of data files being selected.

23. The method of claim 21, wherein providing the graphical user interface further comprises
determining the relevance ranking based on an expert or a celebrity.

24. The method of claim 21, wherein providing the graphical user interface further comprises
determining the relevance ranking based on a reference to a locale, a time, a time period, or an external condition.

25. The method of claim 21, wherein providing the graphical user interface further comprises
configuring two or more of the first, second, and third subset selectors to operate in combination to select a desired set of display data.

26. The method of claim 21, wherein providing the graphical user interface further comprises
determining the relevance ranking based on a chronological order of entry of the first-type and second-type data files into the pool of available data files.

27. The method of claim 21, wherein providing the graphical user interface further comprises
determining the relevance ranking based on a random selection from the pool of available data files.

28. The method of claim 16, wherein providing the graphical user interface further comprises
configuring the first and second sets of labels to include information to identify data files associated with the first-type and second-type user interface elements.

29. The method of claim 28, wherein configuring the first and second sets of labels further comprises
including an advertisement with the first and second sets of labels.

30. The method of claim 28, wherein configuring the first and second sets of labels further comprises
including an email address with the first and second sets of labels.

31. A method comprising:
providing a graphical user interface, the graphical user interface including
a display region operable to display a plurality of target data including first target data and second target data,
a first bounded region circumferentially surrounding the display region, the first bounded region including one or more first-type graphical user interface elements selectively mapped to first position data,
a second bounded region circumferentially surrounding the first bounded region, the second bounded region including one or more second-type graphical user interface elements selectively mapped to second position data,
a first target indicator representing a visual representation of the first target data,
a second target indicator representing a visual representation of the second target data, and
wherein the first and second position data represent a scale of logical or physical position information;
wherein providing the graphical user interface comprises
configuring the first bounded region to include a first concentric ring of one or more first shapes, and the second bounded region comprises a second concentric ring of one or more second shapes; and
configuring the first bounded region to provide a granularity of categories associated with the first bounded region that is one of greater than or less than the second bounded region.

32. A method comprising:
providing a graphical user interface, the graphical user interface including
a center display,
a first display region circumferentially surrounding the center display, the first display region including a plurality of first-type graphical user interface elements,
a second display region circumferentially surrounding the first display region, the second display region including a plurality of second- type graphical user interface elements, and
a plurality of labels, wherein each label represents one of the first-type and second-type graphical user interface elements;
wherein the first display region includes a first concentric ring of one or more first shapes, and the second display region includes a second concentric ring of one or more second shapes; and
wherein the first display region is configured to provide a granularity of categories associated with the first display region that is one of greater than or less than the second display region;
receiving a user input via a user selection of one of the first-type graphical user interface elements;
based on the received user input, selectively mapping the second-type graphical user interface elements to a plurality of second-type data files, wherein the second-type data files represent a subset of a first-type data file mapped to the selected first-type graphical user interface element; and
based on the mapped second-type data files, populating each of the labels representing the second-type graphical user interface elements.

33. A computer readable storage medium having stored thereon instruction, the instructions, when executed by a processor, causing the processor to:
provide a graphical user interface, the graphical user interface including
a display region operable to display a generated result;
a first bounded region circumferentially surrounding the display region, the first bounded region including or more first-type graphical user interface elements,
wherein the one or more first-type graphical user interface elements are selectively mapped to one or more first-type display data; and
a second bounded region circumferentially surrounding the first bounded region, the second bounded region including one or more second-type graphical user interface elements, wherein the one or more second-type graphical user interface elements are selectively mapped to one or more second-type display data; and
receive a user input through the graphical user interface, wherein the generated result is based at least on the user input corresponding to a user activation of at least one of the first-type and second-type graphical user interface elements;
wherein to provide the graphical user interface further causes the processor to
configure the first bounded region to include a first concentric ring of one or more first shapes, and the second bounded region comprises a second concentric ring of one or more second shapes; and
configure the first bounded region to provide granularity of categories associated with the first bounded region that is one of greater than or less than the second bounded region.

34. A system, comprising:
a user interface device; and
a computer operable to interact with the user interface device and provide a graphical user interface to the user interface device,
the graphical user interface includes
a display region operable to display a generated result;
a first bounded region circumferentially surrounding the display region, the first bounded region including one or more first-type graphical user interface elements, wherein the one or more first-type graphical user interface elements are selectively mapped to one or more first-type display data; and
a second bounded region circumferentially surrounding the first bounded region, the second bounded region including one or more second-type graphical user interface elements, wherein the one or more second-type graphical user interface elements are selectively mapped to one or more second-type display data; and
wherein the computer receives a user input at the user interface device through the graphical user interface,
wherein the generated result is based at least on the user input corresponding to a user activation of at least one of the first-type and second-type graphical user interface elements;
wherein when the computer provides the graphical user interface to the user interface device, the computer further
configures the first bounded region to include a first concentric ring of one or more first shapes, and the second bounded region comprises a second concentric ring of one or more second shapes; and
configures the first bounded region to provide a granularity of categories associated with the first bounded region that is one of greater than or less than the second bounded region.

* * * * *